(12) United States Patent
Nishio

(10) Patent No.: US 7,895,361 B2
(45) Date of Patent: Feb. 22, 2011

(54) APPARATUS, METHOD, AND PROGRAM FOR EXECUTING PROTOCOL CONVERTING PROCESS

(75) Inventor: Masahiro Nishio, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 463 days.

(21) Appl. No.: 10/549,152

(22) PCT Filed: May 12, 2004

(86) PCT No.: PCT/JP2004/006699
§ 371 (c)(1),
(2), (4) Date: Sep. 15, 2005

(87) PCT Pub. No.: WO2004/100001
PCT Pub. Date: Nov. 18, 2004

(65) Prior Publication Data
US 2006/0184510 A1 Aug. 17, 2006

(30) Foreign Application Priority Data
May 12, 2003 (JP) ............................. 2003-132831

(51) Int. Cl.
*G06F 15/16* (2006.01)
(52) U.S. Cl. ......................................... 709/246; 707/10
(58) Field of Classification Search ................. 709/246, 709/227, 230, 250; 707/10
See application file for complete search history.

(56) References Cited

U.S. PATENT DOCUMENTS

| | | | |
|---|---|---|---|
| 5,848,415 A * | 12/1998 | Guck ........................... 707/10 |
| 6,292,202 B1 | 9/2001 | Nishio ......................... 345/520 |
| RE37,531 E * | 1/2002 | Chaco et al. ................... 379/38 |
| 2002/0052966 A1 | 5/2002 | Isomura et al. .............. 709/230 |
| 2002/0156947 A1 | 10/2002 | Nishio .......................... 710/36 |
| 2003/0126200 A1* | 7/2003 | Wolff .......................... 709/203 |
| 2003/0137693 A1 | 7/2003 | Nishio ........................ 358/1.15 |
| 2003/0140283 A1 | 7/2003 | Nishio ........................... 714/43 |
| 2004/0085900 A1 | 5/2004 | Nishio ......................... 370/230 |

FOREIGN PATENT DOCUMENTS

| | | |
|---|---|---|
| JP | 06-332868 | 2/1994 |
| JP | 6-332868 A | 12/1994 |
| JP | 14-196990 | 7/2002 |
| JP | 2002-196990 A | 7/2002 |
| JP | 2002-245018 A | 8/2002 |
| JP | 15-006133 | 1/2003 |
| JP | 2003-6133 A | 1/2003 |

* cited by examiner

*Primary Examiner*—Joseph E Avellino
*Assistant Examiner*—Marshall McLeod
(74) *Attorney, Agent, or Firm*—Fitzpatrick, Cella, Harper & Scinto

(57) ABSTRACT

When a device searches a network, there is a case where the device is recognized as different devices as one searched by a protocol A and the other searched by a protocol B. In a proxy server 9300 for executing a protocol converting process in a network system, whether or not another protocol converting apparatus for executing a predetermined protocol converting process does not exist on the network is searched. When another protocol converting apparatus is searched on the network, whether or not the searched protocol converting apparatus has executed the protocol converting process is discriminated.

5 Claims, 27 Drawing Sheets

FIG. 4
M-SEARCH *HTTP/1.1
HOST:239.255.255.250.1900
MAN:"ssdp:discover"
MAX:60
ST:urn:schema-upn-org:service:PrintBasic:1

FIG. 5
HTTP/1.1 200 OK
CACHE-CONTROL:max-age 60
DATE:2002-01-01
EXT
LOCATION:123.123.123.123
SERVER:OS/Version UPnP/1.0product/version
ST:urn:schema-upn-org:service:PrintBasic:1
USN:00-02-2D-33-44-55

FIG. 7

```
<PrinterTable>
    <Printer>
        <PrinterMakerAndModel>PRINTER VENDER NAME MODEL NAME</PrinterMakerAndModel>
        <PrinterName>PRINTER NAME</PrinterName>
        <PrinterLocation>SETTING LOCATION</PrinterLocation>
        <IPAddress>123.123.123.123</IPAddress>
        <MACAddress>00-02-2D-69-43-89</MACAddress>
        <SupportedPDL>PCL</SupportedPDL>
        <SupportedPrintProtocol>LPR</SupportedPrintProtocol>
    </Printer>
    <Printer>
        * * * * * *
        * * * * * *
        * * * * *
    </Printer>
</PrinterTable>
```

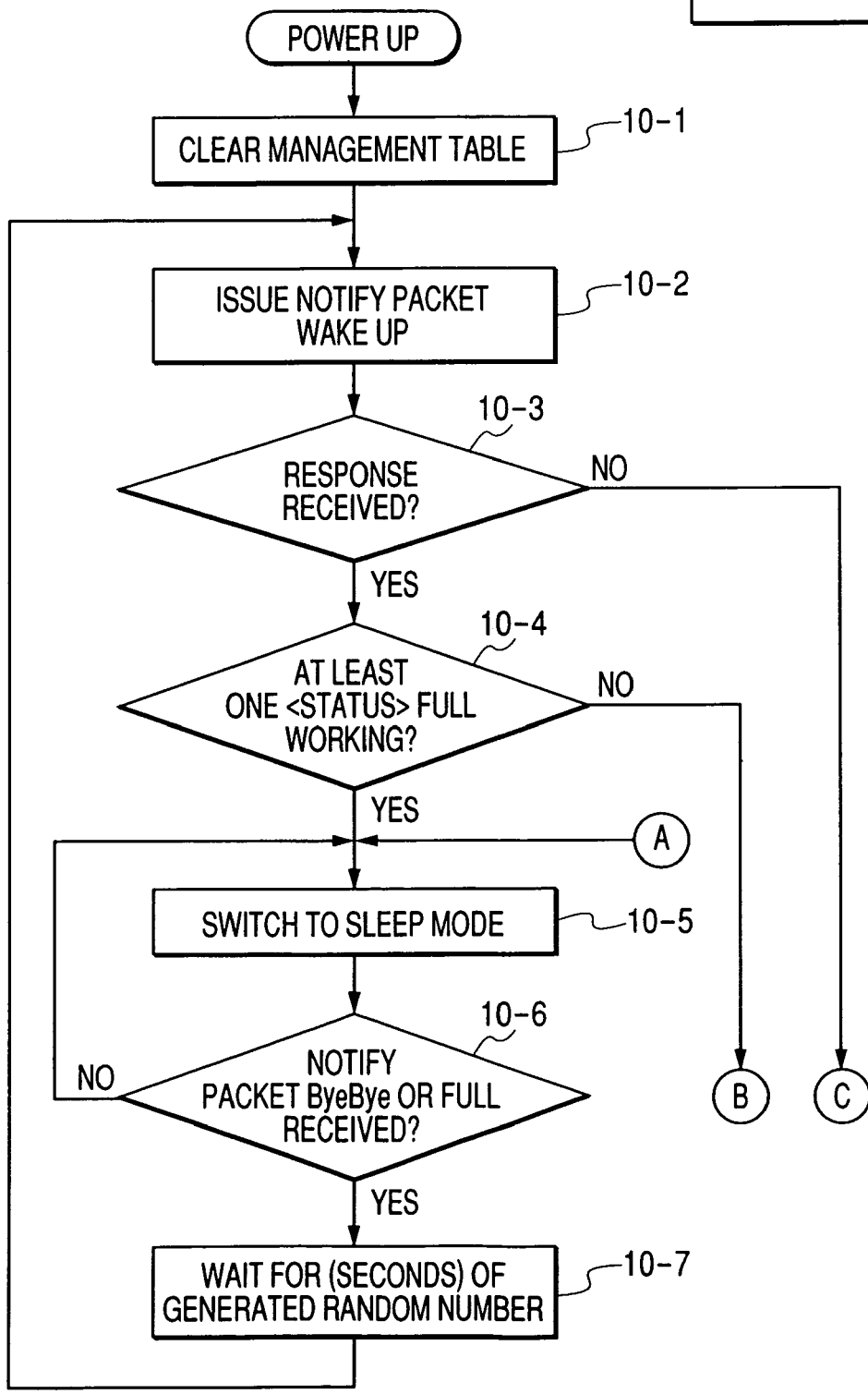

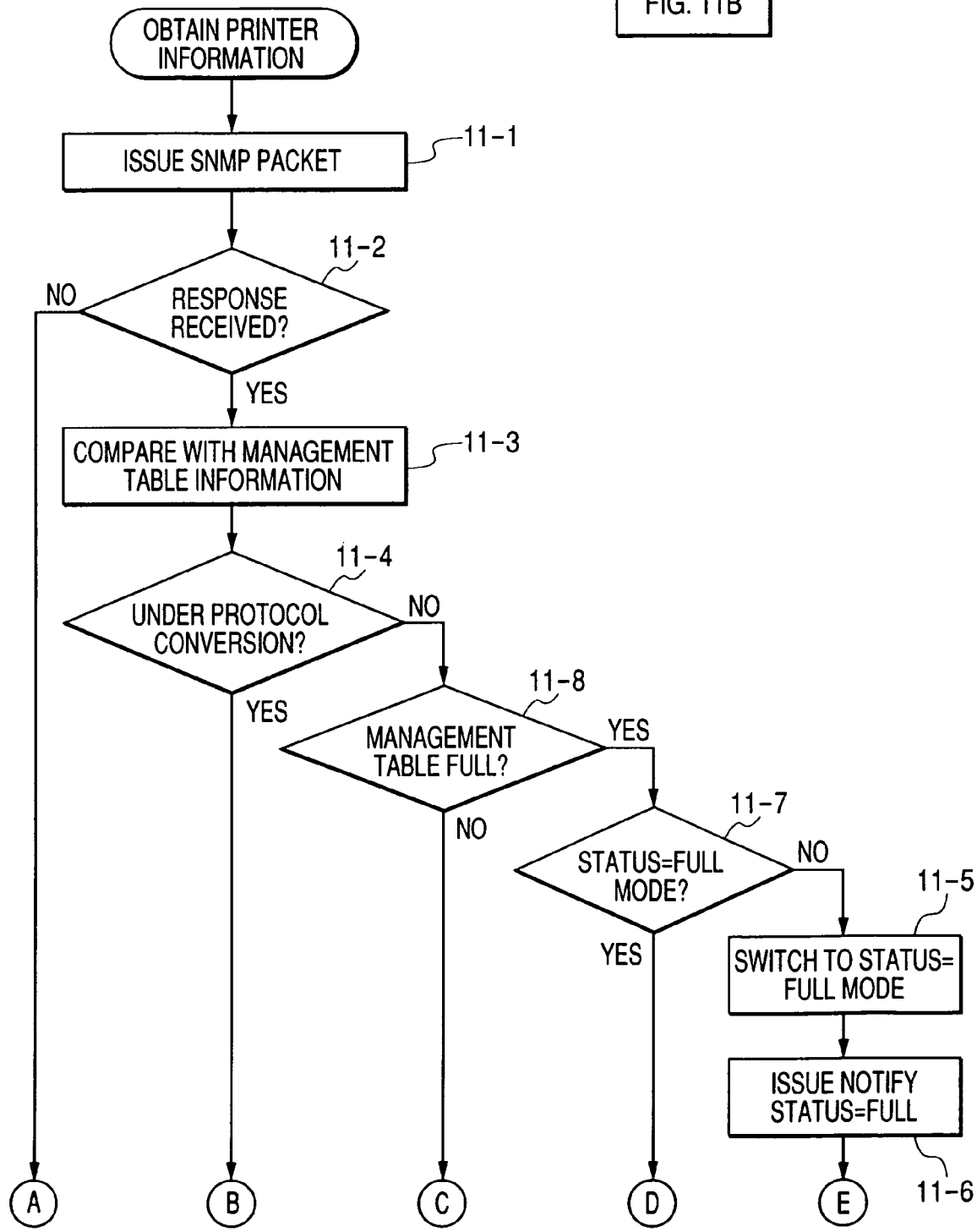

FIG. 14

```
NOTIFY *HTTP/1.1
HOST:239.255.255.250.1900
CACHE-CONTROL:max-age= 60
LOCATION:123.123.222.223

<s:Envelope
    xmlns:s="http://schemas.xmlsoap.org/soap/envelope/"
    s:encodingStyle="http://schemas.xmlsoap.org/soap/encoding/">
  <s:Body>
     <status>WakeUp</status>
     <protocol>UPnP</Protocol>
     <ProxyURL>123.123.222.223</ProxyURL>
     <ProxyMAC>00-02-2D-69-43-89</ProxyMAC>
     <TableURL>123.123.222.223/myTable</TableURL>
  </s:Body>
</s:Envelope>
```

FIG. 15

```
HTTP/1.1 200 OK
CACHE-CONTROL:max-age= 60
LOCATION:123.123.222.001
<s:Envelope
    xmlns:s="http://schemas.xmlsoap.org/soap/envelope/"
    s:encodingStyle="http://schemas.xmlsoap.org/soap/encoding/">
  <s:Body>
     <status>FULL</status>
     <protocol>UPnP</Protocol>
     <ProxyURL>123.123.222.001</ProxyURL>
     <ProxyMAC>00-02-2D-69-43-11</ProxyMAC>
     <TableURL>123.123.222.001/myTable</TableURL>
  </s:Body>
</s:Envelope>
```

FIG. 19

```
<PrinterTable>
    <Printer>
        <PrinterMakerAndModel>PRINTER VENDER NAME MODEL NAME</PrinterMakerAndModel>
        <PrinterName>PRINTER NAME</PrinterName>
        <PrinterLocation>SETTING LOCATION</PrinterLocation>
        <IPAddress>123.123.123.123</IPAddress>
        <MACAddress>00-02-2D-69-43-89</MACAddress>
        <SupportedPDL>PCL</SupportedPDL>
        <SupportedPrintProtocol>LPR</SupportedPrintProtocol>
    </Printer>
    <Printer>
        * * * * * * *
        * * * * * * *
        * * * * * * *
    </Printer>
</PrinterTable>
```

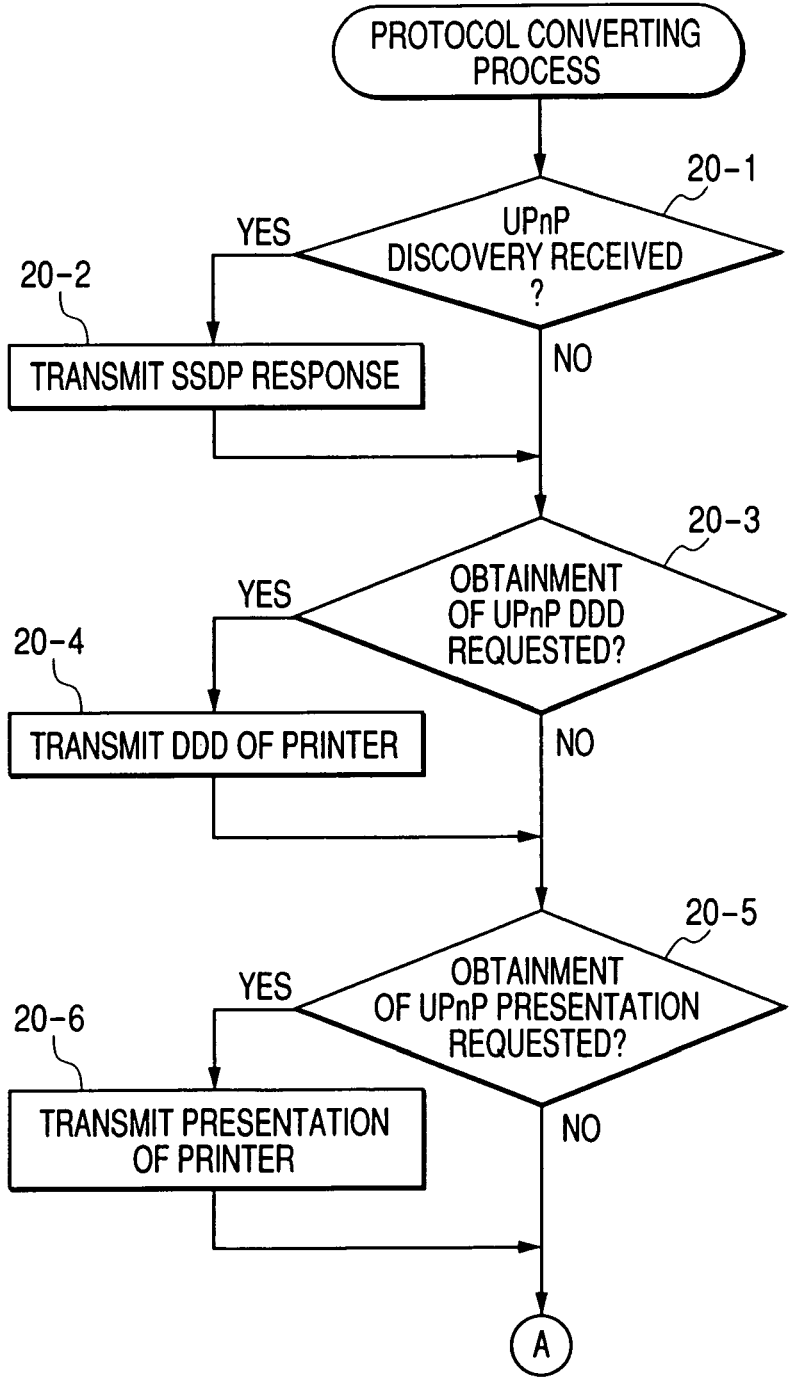

FIG. 23

```
HTTP/1.1 200 OK
CACHE-CONTROL:max-age= 60
LOCATION:123.123.222.002
 <s:Envelope
       xmlns:s="http://schemas.xmlsoap.org/soap/envelope/"
       s:encodingStyle="http://schemas.xmlsoap.org/soap/encoding/">
    <s:Body>
       <status>WORKING</status>
       <protocol>UPnP</Protocol>
       <ProxyURL>123.123.222.002</ProxyURL>
       <ProxyMAC>00-02-2D-69-43-12</ProxyMAC>
       <TableURL>123.123.222.002/myTable</TableURL>
    </s:Body>
 </s:Envelope>
```

FIG. 24

```
NOTIFY *HTTP/1.1
HOST:239.255.255.250.1900
CACHE-CONTROL:max-age= 60
LOCATION:123.123.222.223

<s:Envelope
      xmlns:s="http://schemas.xmlsoap.org/soap/envelope/"
      s:encodingStyle="http://schemas.xmlsoap.org/soap/encoding/">
   <s:Body>
      <status>FULL</status>
      <protocol>UPnP</Protocol>
      <ProxyURL>123.123.222.223</ProxyURL>
      <ProxyMAC>00-02-2D-69-43-89</ProxyMAC>
      <TableURL>123.123.222.223/myTable</TableURL>
   </s:Body>
</s:Envelope>
```

FIG. 25

```
<PrinterTable>
    <Printer>
        <PrinterMakerAndModel>PRINTER VENDER NAME MODEL NAME</PrinterMakerAndModel>
        <PrinterName>PRINTER NAME</PrinterName>
        <PrinterLocation>SETTING LOCATION</PrinterLocation>
        <IPAddress>123.123.123.123</IPAddress>
        <MACAddress>00-02-2D-69-43-89</MACAddress>
        <SupportedPDL>PCL</SupportedPDL>
        <SupportedPrintProtocol>LPR</SupportedPrintProtocol>
    </Printer>
    <Printer>
        ******
        ******
        ******
    </Printer>
</PrinterTable>
```

FIG. 26

```
NOTIFY *HTTP/1.1
HOST:239.255.255.250.1900
CACHE-CONTROL:max-age= 60
LOCATION:123.123.222.223

<s:Envelope
    xmlns:s="http://schemas.xmlsoap.org/soap/envelope/"
    s:encodingStyle="http://schemas.xmlsoap.org/soap/encoding/">
  <s:Body>
    <status>ByeBye</status>
    <protocol>UPnP</Protocol>
    <ProxyURL>123.123.222.223</ProxyURL>
    <ProxyMAC>00-02-2D-69-43-89</ProxyMAC>
    <TableURL>123.123.222.223/myTable</TableURL>
  </s:Body>
</s:Envelope>
```

APPARATUS, METHOD, AND PROGRAM FOR EXECUTING PROTOCOL CONVERTING PROCESS

TECHNICAL FIELD

The invention relates to a network device and a server apparatus for executing a communicating process in accordance with a predetermined protocol, a system including them, a method, a control program, and the like.

BACKGROUND ART

Hitherto, a service providing apparatus and a service providing system for rendering services in response to a service request from a client apparatus on a network have been known.

For example, in association with the remarkable spread of communication by the Internet, network supported apparatuses have rapidly been progressed so that not only conventional personal computers but also user interactive devices such as PDA (Personal Digital Assistance), cellular phone, and the like, image processing apparatuses such as scanner, printer, copying apparatus, digital camera, and the like, and household appliances such as television, air-conditioner, refrigerator, and the like are made to communicate over the network.

In association with such a progress, in order to improve ease of use and simplicity upon using those network supported devices, there have been proposed various protocols for providing automatic setting means of a network address, discovering means of the network device, and automatic setup means of application software for controlling the network supported devices, utility software, operating system, and the like. For example, there are protocols such as "Universal Plug and Play" whose standardization is being progressed mainly by Microsoft Corporation, "BMLinkS" which is progressed by Japan Business Machine Makers Industrial Association (JBMIA), "Renedzvous" which is supported by "Apple OSX", and the like.

While the ease of use and simplicity are improved as a result of the proposition of those protocols, it also caused such a necessity that the network devices correspond to those plurality of protocols. Although the plurality of protocols can be implemented in devices such as high-end copying machine, printer, and the like having large-scaled hardware and a large amount of software-resources, with respect to other devices, each protocol has to be implemented in accordance with a use application, so that it becomes a factor of an increase in development costs. The devices which have already been put into the market and are in an operating state on the network cannot correspond to such protocols.

As means for solving such a problem, a method of making a device called a Proxy or Bridge operative on the network and allowing it to execute a proxy process for the protocol correspondence is ordinarily used.

According to such a conventional technique, however, when a protocol converting process is intended to be executed, for example, if one certain device corresponding to a plurality of protocols A and B exists among other devices, when the device searches the network, the device is recognized as different devices as one searched by the protocol A and the other searched by the protocol B.

When the device executes' the search by a predetermined protocol, it receives a response through a proxy server (protocol converting server). At this time, there is such a problem that when a plurality of protocol converting servers are activated, if one device responds to a searching request, such a response is converted by a plurality of proxy servers for executing the protocol conversion, respectively, and the response from the searched device is made from each proxy server a plurality of times. Consequently, when the search is made, if a plurality of proxy servers exist, it seems as if a plurality of devices existed.

DISCLOSURE OF INVENTION

The invention is made to solve at least one of the foregoing problems and the following means is disclosed.

There is disclosed a control apparatus for executing a protocol converting process in a network system in which a plurality of kinds of protocols exist mixedly, comprising: searching means for multicasting a searching request to a network and searching upon activation whether or not another protocol converting apparatus for executing a predetermined protocol exists on the network; recognizing means for, when such another protocol converting apparatus is searched on the network by the searching means, recognizing whether the searched protocol converting apparatus can execute the protocol converting process or has executed it; and activating means for, when it is recognized by the recognizing means that the searched protocol converting apparatus cannot execute the protocol converting process or does not execute it, activating the protocol converting process. A method and a control program which are applied to such a control apparatus are also disclosed.

There is disclosed a control apparatus for making a protocol converting control with respect to devices, as targets, using a plurality of protocols, comprising: searching means for searching for the device using a first protocol; converting means for converting a second protocol so as to make the device communicate in accordance with the first protocol; recognizing means for recognizing whether or not the device searched by the searching means corresponds to the first protocol; and control means for controlling the converting means so as not to execute the protocol conversion into the first protocol with respect to the device recognized by the recognizing means that the device searched by the searching means corresponds to the first protocol. A method and a control program which can be applied to such a control apparatus are also disclosed.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

FIG. 4 is a diagram showing a format of an M-SEARCH discovery packet which is specified by "Universal Plug and Play Device Architecture v1".

FIG. 5 is a diagram showing a response packet format for the M-SEARCH discovery packet which is specified by "Universal Plug and Play Device Architecture v1".

FIG. 7 is a diagram showing a format of a management table.

FIG. 14 is a diagram showing a packet format of Notify status=WakeUp.

FIG. 15 is a diagram showing a packet format of Notify response packet status=FULL.

FIG. 19 is a diagram showing a format of a management table.

FIG. 23 is a diagram showing a packet format of Notify response packet status=WORKING.

FIG. 24 is a diagram showing a packet format of Notify status=FULL.

FIG. 25 is a diagram showing a format of a management table.

FIG. 26 is a diagram showing a packet format of Notify status=ByeBye.

BEST MODE FOR CARRYING OUT THE INVENTION

In the state where (x) devices which support the protocol A and (y) devices which support both of the protocol A and the protocol B are operating on a network (both x and y are integers of 1 or more), in the case where a proxy for converting the protocol A into the protocol B is activated, the proxy executes a conversion into the protocol B by using the protocol A with respect to the devices which support both of the protocol A and the protocol B. Therefore, due to the intervention of the proxy, there is a possibility that a process is executed to the network client using the protocol B as if (x+2y) devices corresponding to the protocol B were operating, that is, the devices twice as many as the actual number of devices were operating on the network in spite of the identity of the devices which support both of the protocol A and the protocol B. There is such a problem that the intervention of the proxy can become a factor of causing confusion to the user who uses the device.

A preferred embodiment of the invention will now be described as examples in detail hereinbelow with reference to the drawings. Protocols, versions, addresses, numerical values, and the like disclosed in the embodiment do not limit the scope of the invention unless otherwise specified.

Figure 1:
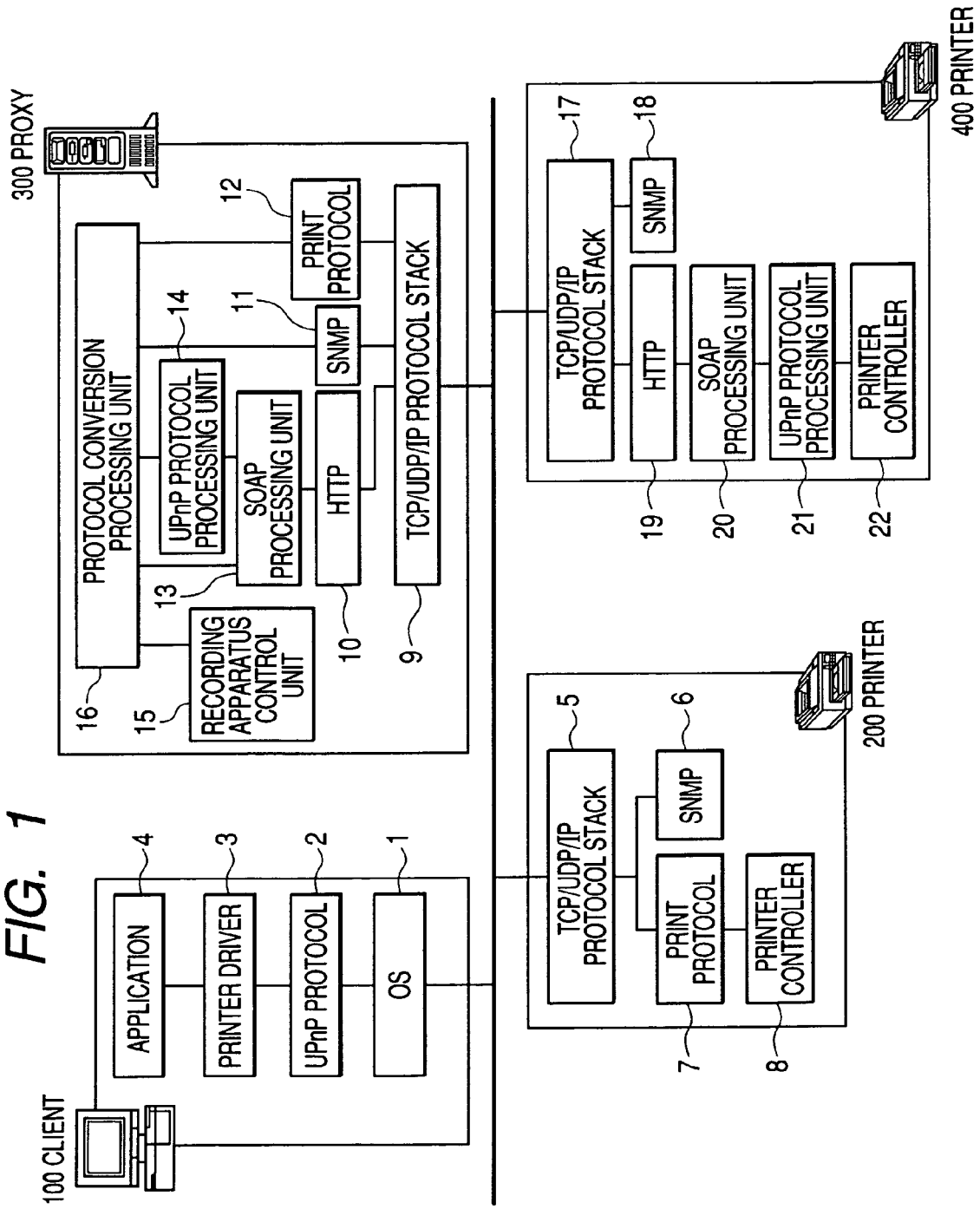
FIG. 1 is a diagram showing each functional construction of a client, a proxy server, and network corresponding printers which construct a protocol conversion system according to an embodiment of the invention.

A protocol conversion system as an embodiment of a service providing system according to the invention will now be described. FIG. 1 is a block diagram showing a construction of a print system according to the embodiment of the invention.

A general operating system such as "Windows™" of Microsoft Corporation, MacOS of Apple Computer Inc., or the like and general applications which can be executed on the operating system have been installed in a client 100. In the case of a "Windows™" OS 1 shown in the embodiment, discovery, control, obtainment of statuses, and the like of the devices on the network are realized by using a "Universal Plug and Play (UPnP)" protocol 2 using "eXtensible Markup Language (XML)"/"Simple Object Access Protocol (SOAP)". After a document formed by, for example, a word processor 4 as application software is converted into printable data by a printer driver 3, a print job is issued by using the UPnP protocol 2 to a UPnP protocol corresponding printer searched and found by the UPnP protocol 2.

A network corresponding device, in the embodiment, a network supported printer 200 has a TCP/UDP/IP protocol stack 5 as a communicating function. A Simple Network Management Protocol (SNMP) processing unit 6 is provided on the protocol stack. A print protocol processing unit 7 is mounted on the protocol stack 5 and has functions for analyzing a print request which is issued by the client and sending the print request to a printer controller 8.

The printer does not have the UPnP protocol processing unit and cannot solely respond to a device searching request using the UPnP protocol and a UPnP print job request which are issued by the client 100.

Another network supported device, in the embodiment, a network supported printer 400 has a TCP/UDP/IP protocol stack 17 as a communicating function. An HTTP 19 is provided on this protocol stack and an analysis of an HTTP request and a response process are executed.

In a manner similar to the network printer 200, a Simple Network Management Protocol (SNMP) processing unit 18 is provided on the protocol stack 17.

A Simple Object Access Protocol (SOAP) processing unit 20 is provided for an upper layer of the HTTP 19 and a UPnP protocol processing unit 21 is also provided. A Print Basic service specified in UPnP Forum has been implemented in the network supported printer 400. The UPnP protocol processing unit has functions for analyzing print jobs and attribute information defined by such a service and sending the print request to a printer controller 22.

A proxy server 300 also similarly has a TCP/UDP/IP protocol stack 9 as a communicating function. An HTTP 10 is provided on this protocol stack and an analysis of an HTTP request and a response process are executed.

A Simple Network Management Protocol (SNMP) processing unit 11 is provided on the protocol stack 9. The search of the network supported printer 200 which does not have the UPnP protocol processing unit and obtainment of information are executed by this protocol.

A print protocol processing unit 12 is mounted on the protocol stack 9 and issuance of a print job to the network supported printer 200 which does not have the UPnP protocol processing unit is executed in the print protocol processing unit 12.

A Simple Object Access Protocol (SOAP) processing unit 13 is provided in an upper layer of the HTTP 10. A UPnP protocol processing unit 14 and a protocol conversion processing unit 16 realize bidirectional communication of data described by "eXtensible Markup Language (XML)" through the SOAP processing unit 13, respectively, with the client 100 and another proxy server, if any exists on the network.

The protocol conversion processing unit 16 is located in an upper layer of the SNMP processing unit 11, SOAP processing unit 13, UPnP processing unit 14, print protocol processing unit 12, and a recording apparatus control unit 15 and executes the following processes. That is, after various XML documents which are used in the UPnP protocol are formed, information of the network supported printer obtained through the SNMP processing unit 11 is recorded into a recording apparatus which is controlled by the recording apparatus control unit 15 or, when there is a request from the UPnP protocol, an XML document recorded in the corresponding management table is read out through the recording apparatus control unit 15 and transmitted to the UPnP protocol processing unit 14, and the like.

When the request for the print job by the UPnP protocol is received, the protocol conversion processing unit 16 obtains a job command and job attribute information through the SOAP processing unit 13, converts their contents into a print protocol supported by the printer whose output has been designated, and thereafter, transmits the job to the designated printer through the print protocol processing unit 12.

The protocol conversion processing unit 16 executes processes for writing and reading out the management table which is managed by the proxy server 300 into/from the recording apparatus which is controlled by the recording apparatus control unit 15 through the control unit 15. Similarly, when the protocol conversion processing unit 16 obtains a management table which is managed by another proxy server existing on the network, it executes processes for writing and reading out it into/from the recording apparatus which is controlled by the recording apparatus control unit 15 through the control unit 15.

Figure 2:
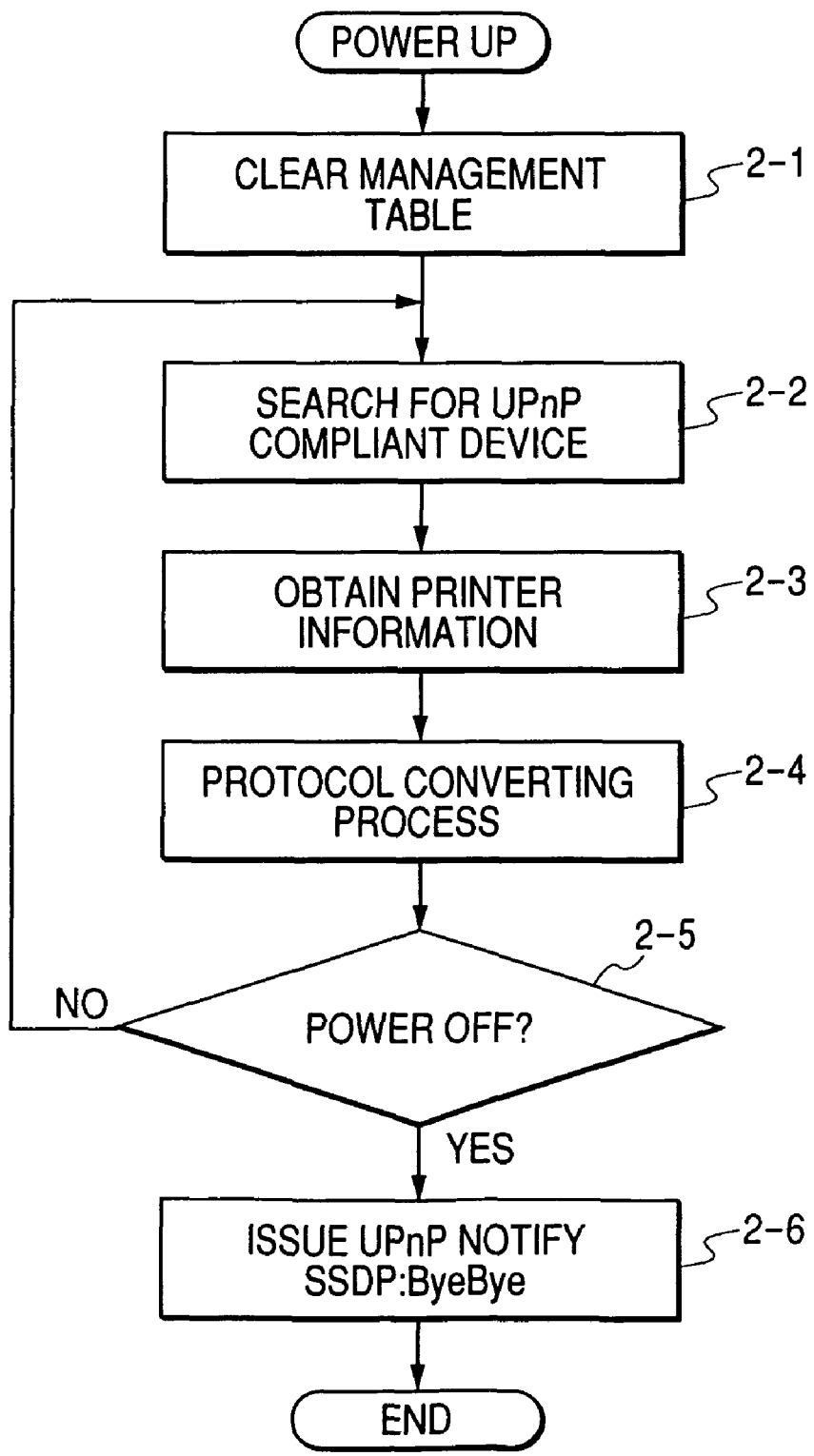
FIG. 2 is a whole flowchart showing a protocol conversion processing method of the protocol conversion system in the invention.

A flow of the control of the present system will now be described hereinbelow in accordance with a flowchart of FIG. 2.

After the protocol conversion processing unit 16 in the proxy server 300 is activated, it clears through the recording apparatus control unit 15 the contents in the management table in which the information of the network device which has executed the protocol converting process is recorded (step 2-1). Details of the management table will be explained in the following processes.

Figure 3:
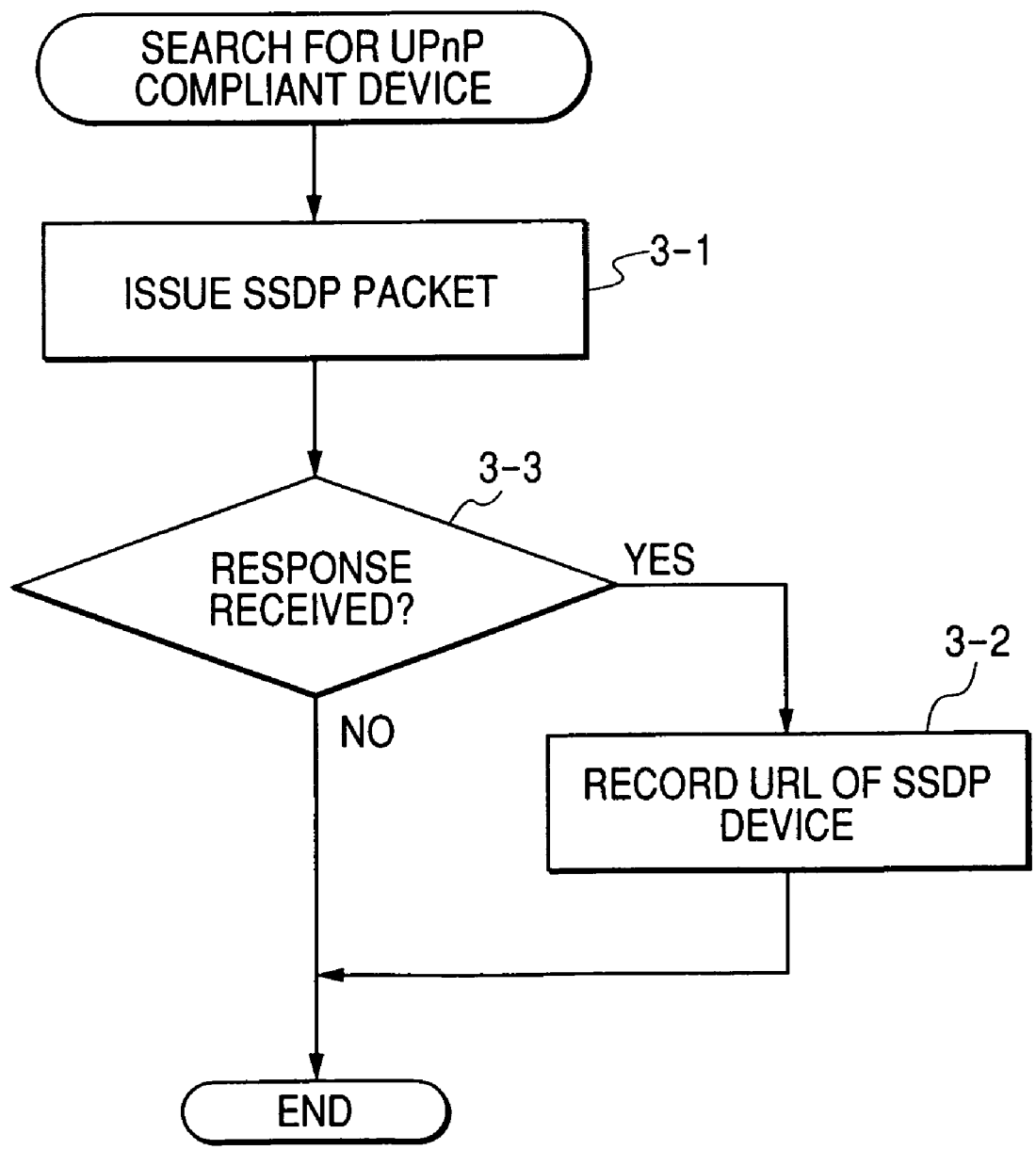
FIG. 3 is a flowchart showing a process for searching for a UPnP compliant printer in the protocol conversion processing method of the protocol conversion system in the invention.

Subsequently, when the client participates in the network and starts services, the UPnP compliant printer existing on this network is searched (step 2-2). Step 2-2 will now be described in detail hereinbelow with reference to FIG. 3. As shown in step 3-1 in a flowchart shown in FIG. 3, an HTTPM-SEARCH packet in a format shown in FIG. 4 and specified in "Universal Plug and Play Device Architecture v1.0" is issued to a multicast address 239.255.255.250 and a port number 1900.

After the M-SEARCH packet is issued, if there is a response within a prescribed predetermined time, for example, in the embodiment, within 30 seconds, the protocol conversion processing unit 16 in the proxy server 300 executes an analysis of a response packet in response to all of the responses.

FIG. 5 shows a format of the response packet from the printer as an example of the network devices. The protocol conversion processing unit 16 in the proxy server 300 records a URL of the network printer disclosed in the packet into the recording apparatus which is controlled by the recording apparatus control unit 15 through the control unit 15. This process is executed to all of the received response packets and the proxy server 300 records URL of all UPnP compliant printers existing on the network (step 3-2).

After completion of the above process or when there is no response in step 3-3, the protocol conversion processing unit 16 in the proxy server 300 finishes the UPnP searching process, advances to step 2-3, and starts to obtain the printer information.

"123.123.123.123" is disclosed as a URL in FIG. 5. The URL is a preferred example of identification information of the network device. ST denotes a service type.

Figure 6:
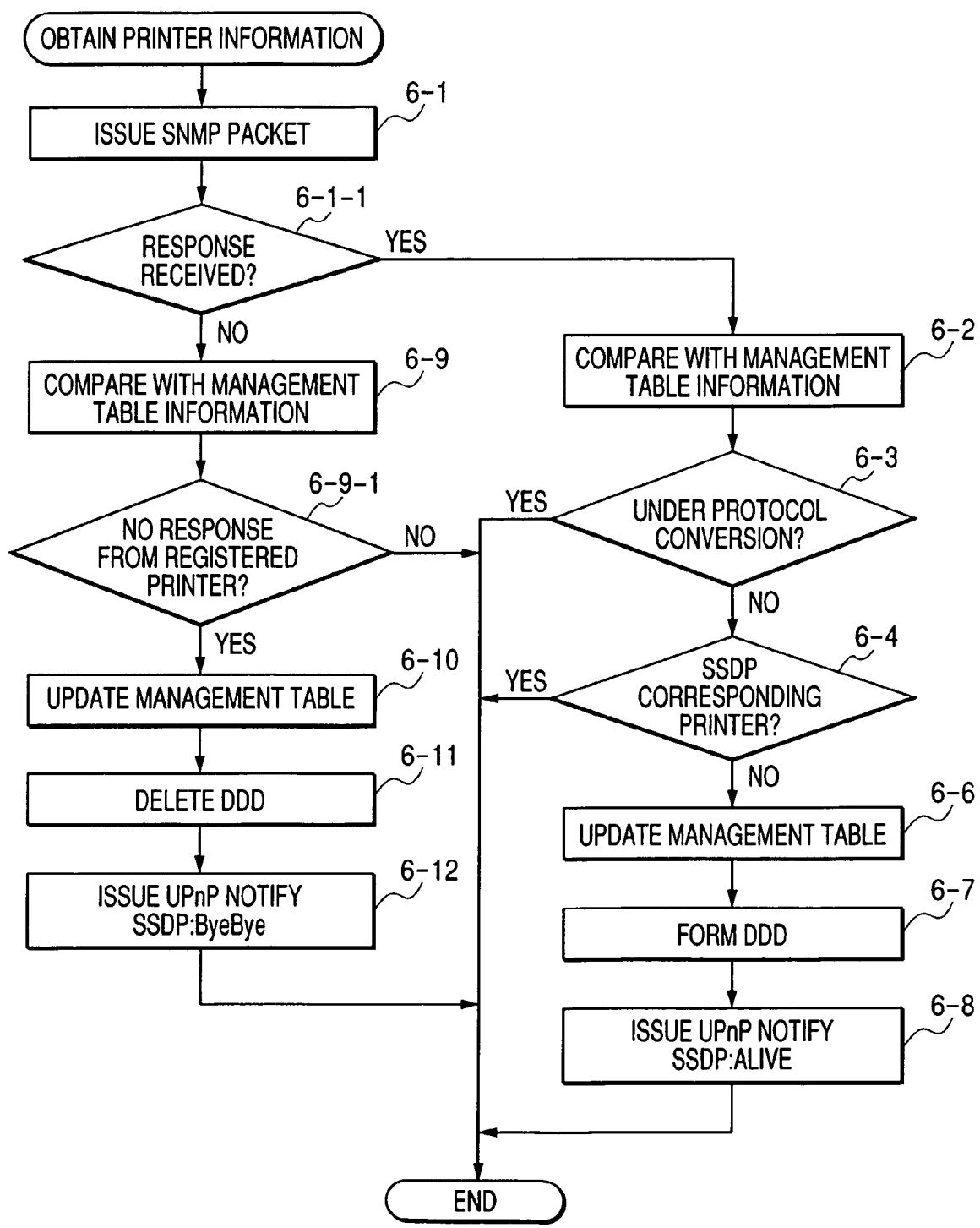
FIG. 6 is a flowchart showing a printer information obtaining process in the protocol conversion processing method of the protocol conversion system in the invention.

A flowchart of FIG. 6 shows a flow for the control of, the obtainment of the printer information. The protocol conversion processing unit 16 in the proxy server 300 broadcasts an SNMP Get request to the following MIB object from the SNMP processing unit 11 in order to obtain the printer information of the printers existing on the network (step 6-1).

PrinterMakerAndModel: Printer vender/model name
PrinterName: Printer name
PrinterLocation: Printer setting location
IPAddress: Printer IP address
MACAddress: Printer MAC address
SupportedPDL: Page description language which is supported
SupportedPrintProtocol: Print protocol which is supported The network supported printers 200 and 400 which received the SNMP Get request form information corresponding to each object in the SNMP processing unit 6 and, thereafter, transmit a response as an SNMP response to the proxy server 300 in a unicast manner.

Whether the response has been received or not is discriminated in S6-1-1. If it is determined in S6-1-1 that the response has been received, S6-2 follows. If it is determined that there is no response, S6-9 follows. The protocol conversion processing unit 16 in the proxy server 300 which received the response from each network supported printer compares contents of each response with contents in the management table which has already been registered in the recording apparatus (step 6-2), thereby discriminating whether or not the printer is a printer which has already executed the protocol conversion (step 6-3).

If it is determined in S6-3 that the printer is a printer which does not execute the protocol conversion, that is, a printer which has newly been found, the protocol conversion processing unit 16 in the proxy server 300 subsequently discriminates whether the printer is a UPnP compliant printer, that is, a printer corresponding to SSDP or not by comparing the URL with a URL of the UPnP compliant printer which has already been recorded in the recording apparatus (step 6-4). An SSDP (Simple Service Discover Protocol) is used for finding the devices connected onto the network and obtaining the functions. The SSDP is a basic portion for constructing UPnP and the standard specifications have been issued from IETF.

In a manner similar to that in the name solution, the IP broadcast is used for finding the devices. When an inquiry is transmitted in the broadcast manner, each device which meets the conditions autonomously transmits an IP address and a host name to an inquiring source side. Information that is unique to the apparatus such as information showing which functions the apparatus has specifically is also exchanged at this time.

In this case, when the printer IP address obtained as a response to the SNMP Get request coincides with the URL recorded in the recording apparatus (step 6-4), it is determined that the printer newly found is the UPnP compliant printer. The protocol conversion is not executed to this printer.

If it is determined that the printer is not the UPnP compliant printer in step 6-4, the protocol conversion processing unit 16 in the proxy server 300 adds the information obtained as a response to the SNMP Get request into the management table, updates it, and records it into the recording apparatus through the recording apparatus control unit 15 (step 6-6).

Subsequently, with respect to the printer newly registered in the management table, "Device Description Document" specified in "Universal Plug and Play Device Architecture v1.0" is formed on the basis of the obtained information and recorded into the recording apparatus through the recording apparatus control unit 15 (step 6-7). In step 6-8, on the basis of notification means specified in "Universal Plug and Play Device Architecture v1.0", a Notify packet regarding all of the printers recorded in the management table is issued by the UPnP protocol processing unit 14, thereby notifying that those printers are executing the services on the network.

If no response is obtained for the SNMP Get request which is issued by the proxy server 300 (NO in step 6-1-1), step 6-9 follows. In step 6-9, the management table is searched and the registered printer is confirmed.

If the response is obtained for the SNMP Get request which is issued by the proxy server 300 (YES in step 6-1-1), step 6-2 follows. The printer devices registered in the proxy server 300 are compared with the information of the printer which made the response. Whether the searched printer exists in the management table or not is confirmed by comparing the management table with the IP address, URL information, or the like of the printer as a target to which the SNMP packet is issued in step 6-1. The processing routine advances to step 6-3.

Although the registered printer has already existed in its own management table, if no response is obtained from this printer (YES in step 6-9-1), the protocol conversion processing unit 16 in the proxy server 300 deletes the information of such a printer from the management table and updates it (step 6-10) and, subsequently, deletes "Device Description Document" (step 6-11).

Although the registered printer already existed in its own management table, if the response is obtained from this printer (NO in step 6-9-1), the printer information obtaining process is finished and the processing routine advances to the next process.

After the protocol conversion processing unit 16 in the proxy server 300 recorded the updated management table into the recording apparatus through the recording apparatus control unit 15, the protocol conversion processing unit issues the Notify packet regarding all of the printers deleted from the management table from the UPnP processing unit 14 on the basis of the notification means specified in "Universal Plug and Play Device Architecture v1.0" and notifies that those printers have stopped the services on the network (step 6-12).

In the invention, as shown in FIG. 7, the management table is managed in a format of a text file in which the contents of the obtained SNMP object mentioned above have been described in XML.

Figure 8:
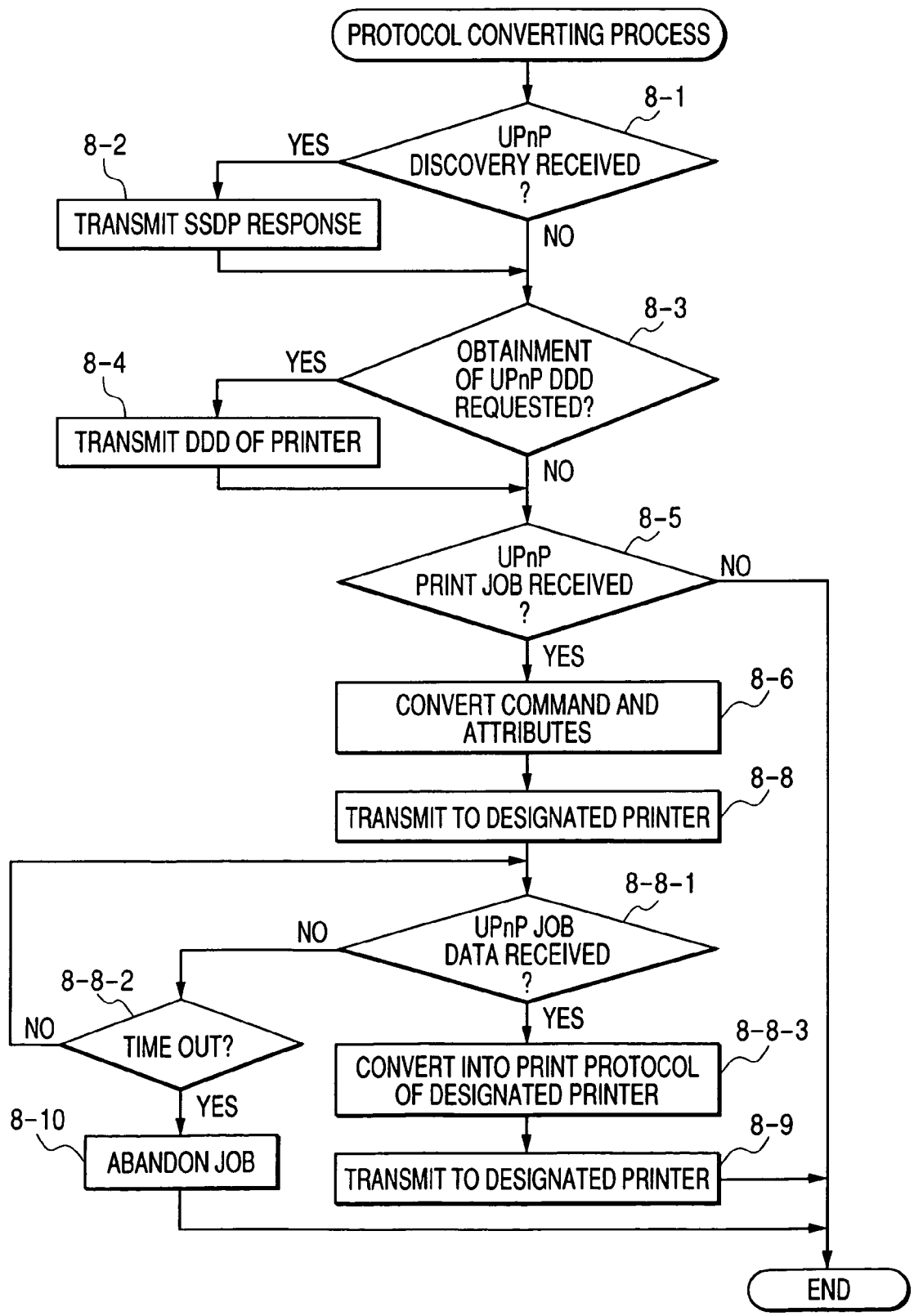
FIG. 8 is a flowchart showing a process for a protocol converting process in the protocol conversion processing method of the protocol conversion system in the invention.

After completion of the printer information obtaining process mentioned above, the protocol conversion processing unit 16 in the proxy server 300 starts the protocol converting process (step 2-4). A flowchart of FIG. 8 shows a flow for the protocol converting process.

The protocol conversion processing unit 16 in the proxy server 300 discriminates whether or not the reception notification of a device searching protocol "Simple Service Discovery Protocol" (SSDP) packet which is issued by the client has been received from the UPnP protocol processing unit 14' and specified in "Universal Plug and Play Device Architecture v1.0". If it is determined that it has been received (YES in step 8-1), the management table which is managed by the protocol conversion processing unit 16 in the proxy server 300 is searched through the recording apparatus control unit 15. The URL in which "Device Description Document" of the printer corresponding to the searching conditions of the SSDP packet has been recorded is returned as an SSDP response through the UPnP protocol processing unit 14 (step 8-2), and step 8-3 follows.

Whether or not a request to obtain "Device Description Document" has been received through the UPnP protocol processing unit 14 by the HTTPGet request from the client device which obtained such a URL is discriminated. If it is determined that the obtaining request has been received (YES in step 8-3), the management table which is managed by the protocol conversion processing unit 16 in the proxy server 300 is searched through the recording apparatus control unit 15. "Device Description Document" recorded in the designated URL is read out and, thereafter, returned through the UPnP protocol processing unit 14 (step 8-4).

The print job is issued from the client device which obtained "Device Description Document" on the basis of control means specified in "Universal Plug and Play Device Architecture v1.0". Since the job command and the job attributes are described in the format of XML in this case, if the protocol conversion processing unit 16 in the proxy server 300 received the print job through the UPnP protocol processing unit 14 (YES in step 8-5), the protocol conversion processing unit 16 analyzes the command and the job attributes in the SOAP processing unit. Subsequently, the print protocol which is supported and the IP address are obtained through the recording apparatus control unit 15 from the management table information corresponding to the printer whose output has been designated. The received command and attribute information are converted into the print protocol (step 8-6). After that, the information after the conversion is transmitted to the IP address of the printer whose output has been designated (step 8-7).

The client which issued the print job subsequently transmits job data, in this case, PDL to the proxy server 300 by using an HTTPPost command on the basis of the control means specified in "Universal Plug and Play Device Architecture v1.0". The protocol conversion processing unit 16 in the proxy server 300 received the job data converts the received job data into the print protocol which is supported by the designated printer (step 8-8) in a manner similar to that in the foregoing step and transmits the job data to the printer IP address obtained before (step 8-9).

Whether the UPnP job data has been received or not is discriminated (step 8-8-1).

Whether or not the reception of the job data from the client is not started within a specified time, for example, in the embodiment, within 30 seconds is discriminated. If it is determined that the reception is not started (YES in step 8-8-2), the job is abandoned (step 8-10). If the reception is started, the job is not abandoned but the apparatus waits for the reception in S8-8-1 (NO in step 8-8-2).

The printer which received the job command, job attributes, and job data analyzes the job command and job attributes in the print control unit, thereafter, transmits the print job to the printer controller, and executes printing.

The proxy server 300 in the invention repetitively executes the foregoing processes in steps 2-2 to 2-4 to thereby periodically update the operating situation of the network printer, and executes the protocol converting process in accordance with the updated information.

When the protocol conversion processing unit 16 in the proxy server 300 stops the protocol converting process because of the power-off in step 2-5, the protocol conversion processing unit 16 reads out all of the management tables through the recording apparatus control unit 15 on the basis of the notification means specified in "Universal Plug and Play Device Architecture v1.0", issues the Notify packet regarding all of the printers recorded in the management table through the UPnP protocol processing unit 14, thereby notifying that those printers stopped the services on the network (step 2-6). When the protocol converting process is not stopped in step 2-5, the processing routine is returned to step 2-2.

As described above, in the proxy server 300 as an example of the control apparatus which makes the protocol conversion control with respect to the devices using a plurality of protocols as targets, the proxy server comprises: the searching means (3-1 to 3-2 in FIG. 3) for searching for the device using SSDP of UPnP as an example of the first protocol; the converting means (for example, 2-4 and the process in FIG. 8) for protocol-converting the search packet of SNMP as an example of a second protocol so as to make the device communicate in accordance with SSDP; the recognizing means (step 6-3) for recognizing whether or not the device searched by the searching means corresponds to SSDP; and the control means (step 6-4) for controlling the converting means so as not to execute the protocol conversion into SSDP with respect to the device recognized by the recognizing means that the device searched by the searching means corresponds to SSDP.

Although the embodiment in which the printer is the network device has been shown above, the network supported device can be any of a storage device such as a hard disk or the like, a scanner, a copying apparatus, and a device having hybrid functions of them. Such a device can be realized in any of those apparatuses so long as the attribute information can be exchanged and the job can be transmitted and received to/from the proxy server through the communicating function. In this case, the communicating protocol between the proxy server and the network supported device can be similarly realized by any of the standardized protocol, the general protocol, and the protocol that is unique to the vender.

Although the embodiment has been shown with respect to the network supported device as an example, it can be also realized by communication which is made by the local connection according to USB, IEEE1394, parallel connection, or the like.

Although the proxy server exists on the network in an independent form in the embodiment, such a proxy server function can be also realized in the case where it is physically or logically implemented in the network supported device.

Although the example of "Universal Plug and Play" specified mainly by Microsoft Corporation, SNMP implemented in the network supported printer, and the print protocol has been shown as a combination of the protocol conversion which is provided by the proxy server in the embodiment, the protocol conversion can be also realized in the case of the protocol such as "Rendezvous" proposed by Apple Computer Inc., "BMLinkS" proposed by JBMIA, or the like. The protocol conversion can be also used not only in the case of the protocol in which the search and the control of the devices are integrated but also in the case of the protocol for searching for the services provided by the device such as "Service Location Protocol (SLP)", "Multicast DNS Service Discovery", or the like and a protocol such as "Web Service" for converting the device control in a "Remote Procedure Call (RPC)" format based on XML/SOAP into the conventional control protocol.

Although the embodiment has been shown with respect to the example in which the HTTP/TCP/UDP/IP protocol is used as an information notifying protocol between the proxy servers, the invention does not depend on transporting means but can be also realized in the case of using another general protocol or an original protocol so long as it can make the bidirectional communication.

As another aspect to be solved by the embodiment, there is such a problem that when (N) proxies each corresponding to the same protocol, for example, each for converting the protocol A into the protocol B operate on the network, one network device is proxy-controlled by those (N) proxies, there is a possibility that for the network client using the protocol B, the process is executed as if the different (N) network devices operate on the network in spite of the same network device, so that it can cause a confusion of the user who uses it.

There is ordinarily a limitation in the number of devices in which the proxy can execute the proxy process of the protocol. For example, in the state where two proxies 1 and 2 for converting the protocol A into the protocol B operate on the network, if the number of devices in which the proxy converting process of the proxy 1 is equal to M and the number of devices in which the proxy converting process of the proxy 2 is equal to N (M>N), there is a possibility that the proxy 1 and the proxy 2 mutually execute the protocol converting process for the same network device. There can be a case where in spite of the fact that the protocol converting processes of the (M+N) network devices can be executed by two proxies, the processes of only up to (M) network devices can be executed. In this case, two proxies execute the overlapped processes for the (N) network devices and as mentioned above, the overlapped processes are processed as if (2×N) different network devices existed.

A preferred embodiment of the invention will now be described as an example hereinbelow with reference to the drawings. The protocols, versions, addresses, numerical values, and the like disclosed in the embodiment do not limit the scope of the invention unless otherwise specified.

Figure 9:
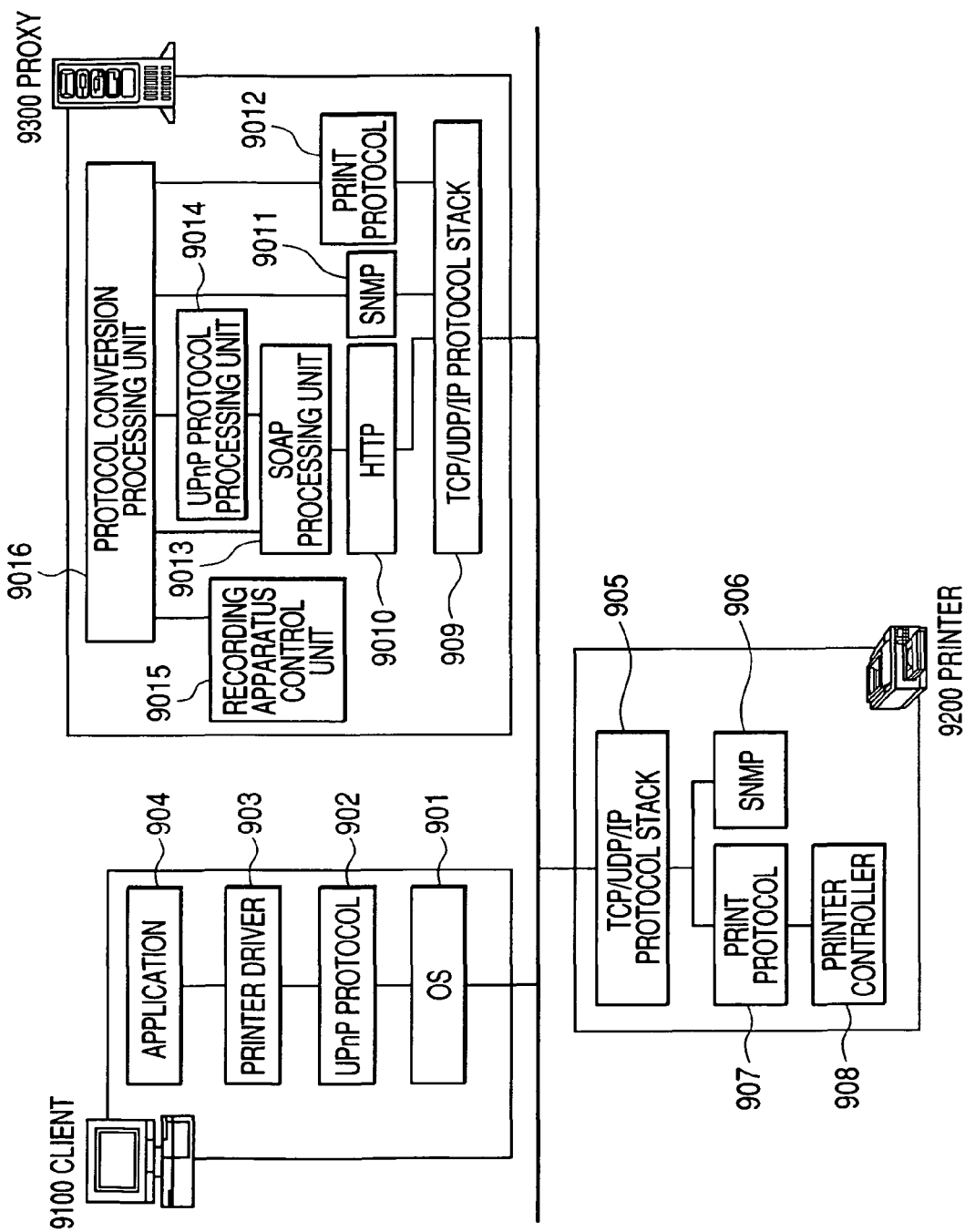
FIG. 9 is a diagram showing each functional construction of the client, proxy server, and network corresponding printer which construct a protocol conversion system according to an embodiment of the invention.

A protocol conversion system as an embodiment of the service providing system according to the invention will now be described. FIG. 9 is a block diagram showing a print system according to the embodiment of the invention.

The general operating system such as "Windows™" of Microsoft Corporation, "Mac OS (registered trademark)" of Apple Computer Inc., or the like and the general applications which can be executed on the operating system have been installed in the client 9100. In the case of an OS 901 shown in the embodiment, discovery, control, obtainment of statuses, and the like of the devices on the network are realized by using the "Universal Plug and Play (UPnP)" protocol 902 using "eXtensible Markup Language (XML)"/"Simple Object Access Protocol (SOAP)". For example, after a document formed by the word processor 904 as application software is converted into printable data by a printer driver 903, a print job is issued by using a UPnP protocol 902 to a UPnP protocol corresponding printer searched and found by the UPnP protocol (registered trademark) 902.

A network corresponding device, in the embodiment, the network supported printer 9200 has the TCP/UDP/IP protocol stack 905 as a communicating function. A Simple Network Management Protocol (SNMP) processing unit 906 is provided on the protocol stack. A print protocol processing unit 907 is mounted on the protocol stack 905 and has functions for analyzing a print request which is issued by the client and sending the print request to a printer controller 908.

The printer does not have the UPnP protocol processing unit and cannot solely respond to a device searching request using the UPnP protocol and a UPnP print job request which are issued by a client 9100.

A proxy server 9300 also similarly has a TCP/UDP/IP protocol stack 909 as a communicating function. An HTTP processing unit 9010 is provided on this protocol stack and an analysis of the HTTP request and the response process are executed.

A Simple Network Management Protocol (SNMP) processing unit 9011 is provided on the protocol stack 909. A search for the network supported printer 200 which does not have the UPnP protocol processing unit and obtainment of the information are executed by such a protocol.

A print protocol processing unit 9012 is provided on the protocol stack 909 and the issuance of a print job to the network supported printer 9200 which does not have the UPnP protocol processing unit is executed by the print protocol processing unit 9012.

A Simple Object Access Protocol (SOAP) processing unit 9013 is provided in an upper layer of the HTTP 9010. A UPnP protocol processing unit 9014 and a protocol conversion processing unit 9016 realize the bidirectional communication of data described by the "eXtensible Markup Language (XML)" through the SOAP processing unit 9013, respectively, with the client 9100 and another proxy server, if any exists on the network.

The protocol conversion processing unit 9016 is located in an upper layer of the SNMP processing unit 9011, SOAP processing unit 9013, UPnP processing unit 9014, print protocol processing unit 9012, and a recording apparatus control unit 9015 and executes the following processes. That is, after various XML documents which are used in the UPnP protocol are formed, the information of the network supported printer obtained through the SNMP processing unit 9011 is recorded into a recording apparatus which is controlled by the recording apparatus control unit 9015 or, when there is a request from the UPnP protocol, the XML document recorded in the corresponding management table is read out through the recording apparatus control unit 9015 and transmitted to the UPnP protocol processing unit 9014, and the like.

When the request for the print job by the UPnP protocol is received, the protocol conversion processing unit 9016 obtains a job command and job attribute information through the SOAP processing unit 9013, converts their contents into a print protocol supported by the printer whose output has been designated, and thereafter, transmits the job to the designated printer through the print protocol processing unit 9012.

The protocol conversion processing unit 9016 obtains detailed contents of the Notify request which is issued from another proxy server through the SOAP processing unit 9013 and executes a process according to such contents.

The protocol conversion processing unit 9016 executes processes for writing and reading out the management table which is managed by the proxy server 9300 into/from the recording apparatus which is controlled by the recording apparatus control unit 9015 through the control unit 9015.

Similarly, when the protocol conversion processing unit 9016 obtains a management table which is managed by another proxy server existing on the network, it executes processes for writing and reading out it into/from the recording apparatus which is controlled by the recording apparatus control unit 9015 through the control unit 9015.

Figure 10B:
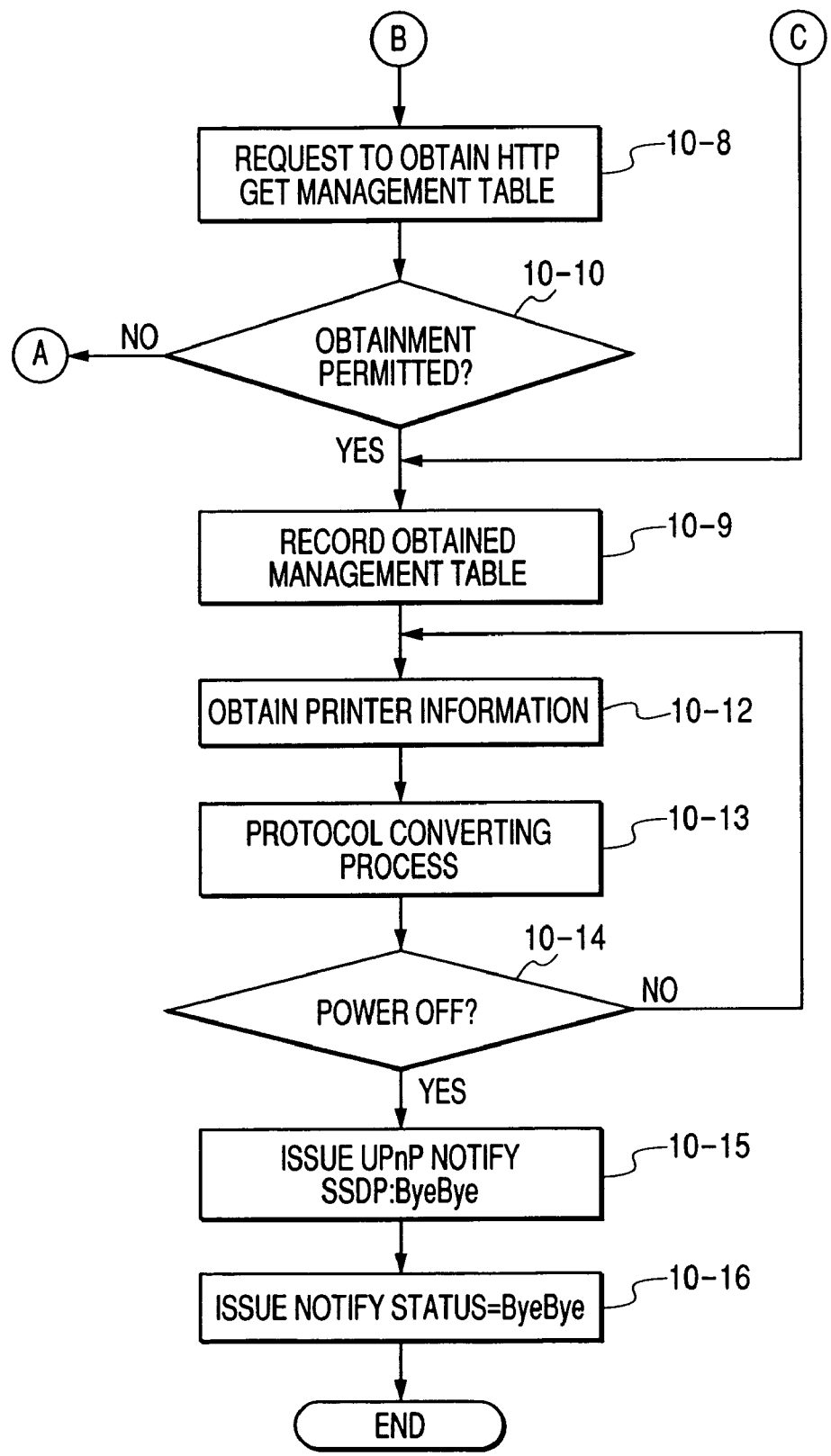
FIG. 10 is composed of FIGS. 10A and 10B showing flowcharts of the protocol conversion processing method of the protocol conversion system in the invention.
Figure 13:
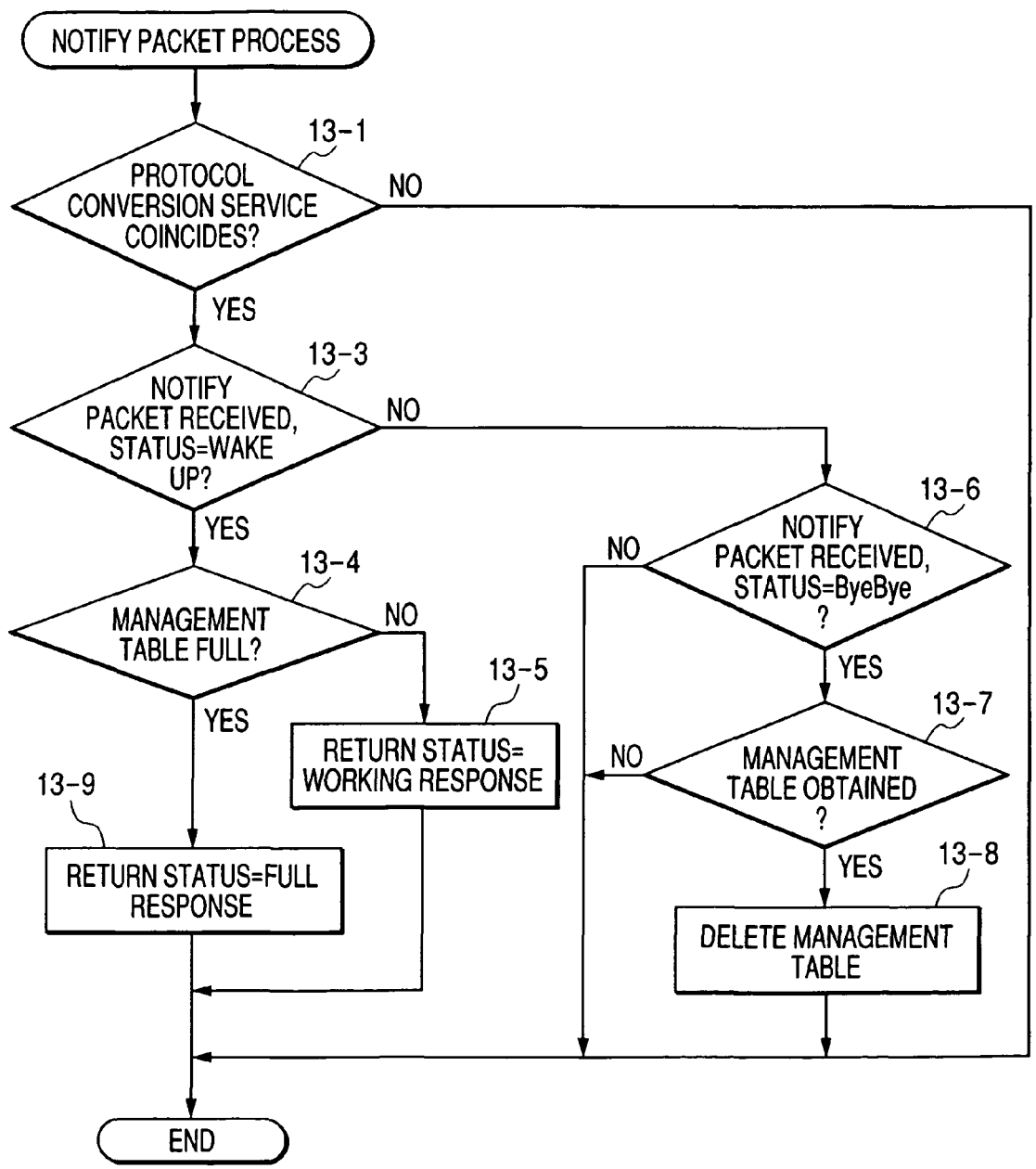
FIG. 13 is a flowchart showing a process for a Notify packet process in the protocol conversion processing method of the protocol conversion system in the invention.

A flow of the control of the present system will now be described hereinbelow in accordance with flowcharts of FIGS. 10A and 10B. FIGS. 10A and 10B are diagrams showing a flowchart for an arbitrating process of the proxy server for executing the protocol conversion. FIG. 13 is a flowchart showing a process in the case where the proxy server which has already been activated received a Notify packet from the proxy server just after the activation. By the processes shown in the flowcharts, each proxy server is controlled so as to guarantee that the number of proxy servers in the working mode is equal to 1 on the network. In the embodiment, only the proxy servers in the working mode newly accept the protocol process of the device which is newly added. Thus, it is possible to prevent such a situation that a plurality of proxy servers exist on the network at random and execute the protocol converting process without any order.

A processing routine of FIGS. 10A and 10B are started when the proxy server is activated. According to this processing routine, the proxy server 9300 which was newly activated discriminates whether another proxy server (not shown) has already been activated on the network or not.

The protocol conversion processing unit 9016 in the proxy server 9300 controls the recording apparatus control unit 9015 after the activation and clears and initializes the contents in the management table for recording the information of the network device which has already executed the protocol converting process (step 10-1). Details of the management table will be described in the following processing steps. Subsequently, when the client participates in the network and starts services, a Notify packet is issued to other proxy servers existing on this network (step 10-2).

At this time, an HTTPNotify request in a format shown in FIG. 14 is issued as an HTTP packet to the multicast address 239.255.255.250 and the port number 1900.

In the embodiment, the status information of the proxy server, a name of the protocol converting process supported by this proxy server, a URL of the proxy server, a physical address, and a storage destination URL of the management table are described in an XML format into an entity body of the HTTPNotify request and notified.

In the diagram,
  <status>: Indicates an operation status of the proxy server. Upon activation, WakeUP is described.
  <protocol>: Indicates a protocol which can be converted by the proxy server. A protocol name such as UPnP, BMLinkS, Rendezvous, or the like is described. In the embodiment, UPnP proposed mainly by Microsoft Corporation is described as an example.
  <ProxyURL>: An IP address of the proxy server is described in the URL format.
  <ProxyMAC>: A physical address (MAC) of the proxy server is described.
  <TableURL>: A storing address in the management table which is managed by the proxy server is described in the URL format.

A flowchart of FIG. 13 shows a control flow in the case where the other proxy servers which have already existed on the network received the Notify packet from the proxy server 9300. In the case where the proxy servers other than the proxy server 9300 exist on the network and have already executed the protocol converting process, after the HTTPNotify request 300 is received in the HTTP 9010, an analysis of an entity body 301 of the request is executed in the SOAP processing unit 9013 and whether or not the protocol as a target of the conversion by the proxy server of a transmitting source side of the Notify packet coincides with the protocol as a target of the conversion by the proxy server which received the Notify packet is discriminated in step 13-1.

The SOAP processing unit 9013 checks the contents of <protocol>. If it is determined in step 13-1 that the name of the corresponding protocol does not coincides with the protocol converting process which is provided by itself, the SOAP processing unit 9013 ignores the Notify request.

If it is determined in step 13-1 that the name of the corresponding protocol coincides with the protocol converting process which is provided by itself, step 13-3 follows. The SOAP processing unit 9013 checks the contents of <status> tag and discriminates whether its element is WakeUP or not in step 13-3.

If it is determined in step 13-3 that the element is WakeUP, step 13-4 follows. The protocol conversion processing unit 9016 reads out the management table through the recording apparatus control unit 9015 and discriminates whether or not a status of the protocol converting process which is being executed at present by the unit 9016 itself indicates that (the number of devices whose protocol converting process is possible)=(the number of devices whose protocol converting process is being executed). If it is determined in step 13-4 that the server is in the status where the protocol converting process cannot be newly provided any more, step 13-9 follows. An HTTP response 400 in a format shown in FIG. 15 is issued in a unicast manner to the proxy server 9300 which issued the HTTPNotify request. At this time, it is assumed that the SOAP processing unit 9013 forms the following information XML-format date as an entity body of the HTTP response 400, a network interface (not shown) is controlled through the TCP/UDP/IP protocol stack of the proxy server 9300, and such data is notified. "FULL" denotes that the management server of the proxy server is full and the number of devices as targets of the protocol converting process in the proxy server has reached the maximum value.

Each label shown in FIG. 15 will now be described.
<status>: Label showing the operation status of the proxy server (any information such as tag or descriptor can be used so long as it can be identified). In this case, it is used to notify FULL, that is, the status where the converting process cannot be provided any more.
<protocol>: Indicates the protocol which can be converted by the proxy server. A protocol name such as UPnP, BMLinkS, Rendezvous, or the like is described. In the embodiment, UPnP proposed mainly by Microsoft Corporation is described as an example.
<ProxyURL>: An IP address of the proxy server is described in the URL format.
<ProxyMAC>: A physical address (MAC) of the proxy server is described.
<TableURL>: A storing address in the management table which is managed by the proxy server is described in the URL format.

When the status of the protocol converting process which is being executed at present by the server itself indicates that the number of devices whose protocol converting process is possible is larger than the number of devices whose protocol converting process is being executed, that is, if the server is in the status where the protocol converting process can be newly provided, step 13-5 follows. An HTTP response 400 in a format shown in FIG. 23 is issued in a unicast manner to the proxy server 9300 which issued the HTTPNotify request. At this time, the following information is described in the XML format as an entity body of the HTTP response 400 and notified.

In this case,
<status>: Indicates the operation status of the proxy server. In this case, WORKING is notified, that is, it is notified that the other protocol conversion proxy servers do not need to operate.
<protocol>: Indicates the protocol which can be converted by the proxy server. A protocol name such as UPnP, BMLinkS, Rendezvous, or the like is described. In the embodiment, UPnP proposed mainly by Microsoft Corporation is described as an example.
<ProxyURL>: An IP address of the proxy server is described in the URL format.
<ProxyMAC>: A physical address (MAC) of the proxy server is described.
<TableURL>: A storing address in the management table which is managed by the proxy server is described in the URL format.

If it is determined in step 13-3 that the element is not WakeUP, step 13-6 follows and whether the Notify packet showing that the proxy server is shut down is a ByeBye packet or not is discriminated. If it is not the ByeBye packet in step 13-6, the processing routine is finished. If it is determined that it is the ByeBye packet, step 13-7 follows. In step 13-7, whether or not the management table has already been obtained from the proxy server of the transmitting source side of the ByeBye packet is discriminated. If it has already been obtained, the management table is deleted and the processing routine is finished. If it is not obtained, the processing routine is finished.

Returning to the flowcharts of FIGS. 10A and 10B, the processes on the proxy server 9300 side which was newly activated will be described. After the Notify packet is issued, if there is a response within a prescribed predetermined time, for example, in the embodiment, within 30 seconds (step 10-3), the protocol conversion processing unit 9016 executes an analysis of the entity body of the response packet in accordance with all responses.

Whether or not a response of the status in which the description of the element of the <status> tag in the entity body shows that at least one device is WORKING as a result of the analyzing process in the SOAP processing unit 9013 has been returned is discriminated (step 10-4).

As already described by using FIG. 13, the Notify packet which is received from the external proxy server is either "Status=FULL" or "Status=WORKING".

If YES in step 10-4, that is, if "Status=WORKING", it is determined that even if the server 9300 itself does not start the services, the process can be executed by the proxy which has already been in the operating mode on the network. In this case, the protocol conversion processing unit of the proxy server 9300 is switched to a sleep mode (step 10-5), is held in the sleep mode until a Notify message is received from another proxy, and enters a standby mode (step 10-6). When the Notify packet is received in step 10-6, the protocol converting process is not executed after that. A random number is generated and after the elapse of a time corresponding to a value of the random number (step 10-7), the WakeUP packet is issued again to the other proxy server (step 10-2).

As a result of the analyzing process in the SOAP processing unit 9013, if the SOAP processing unit 9013 determines that the description of the element of the <status> tag in the entity body of the response from the external proxy server which was received in step 10-3 indicates the status of all FULL or indicates that there is no response of WORKING, the SOAP processing unit 9013 determines that although the proxy which is at present operating exists on the network, the proxy which is operating cannot provide new services any more. In other words, if it is determined in step 10-4 that at least one response from another proxy server of "status WORKING" has been returned, this means that "status=FULL".

In this case, the protocol conversion processing unit 9016 in the proxy server 9300 makes a request for obtaining the management tables from all of the proxies which transmitted the response of "status=FULL" (step 10-8). That is, the HTTPGet request is issued by the HTTP processing unit 9010 to the URL described in <TableURL>, thereby obtaining the management tables from the proxies in the FULL status.

Subsequently, whether the obtainment is permitted or not is discriminated in step 10-10. If the obtainment is not permitted, step 10-5 follows. If the obtainment is permitted, step 10-9 follows. Subsequently, the obtained management tables are recorded into the recording apparatus of the proxy server 9300 through the recording apparatus control unit 9015 (step 10-9).

Although not shown, if there is no response from the external proxy server, the processing routine can be moved to an error process for notifying that no proxy exists.

The printer device recorded in the obtained management table is executing the protocol converting process by the proxy in the FULL status. Therefore, for the printer device recorded in the table, the CPU in the proxy server 9300 controls the protocol conversion processing unit 9016 so as not to execute the protocol converting process.

According to the invention, therefore, it is possible to avoid such a situation that a plurality of proxy servers execute in an overlapping manner the protocol converting process to the same network corresponding device, in the invention, the same network corresponding printer.

The other proxy server which received the obtainment permission in the FULL status on the network is implemented so as to transmit only once the management table which is managed by the proxy server itself which switched to the WakeUP status in response to the management table obtaining request. When a plurality of proxies exist, the management table is transmitted only to one of them. The CPU in the proxy server which executed the transmission of the management table once subsequently controls so as not to respond to the management table obtaining request. This process will be explained in FIGS. 12A and 12B.

That is, according to the invention, the number of proxy servers which can switch to the protocol converting process from the WakeUP status is limited to one and, at the same time, it is avoided that a plurality of proxy servers in the WakeUP status are made operative.

Figures 12, 12A:
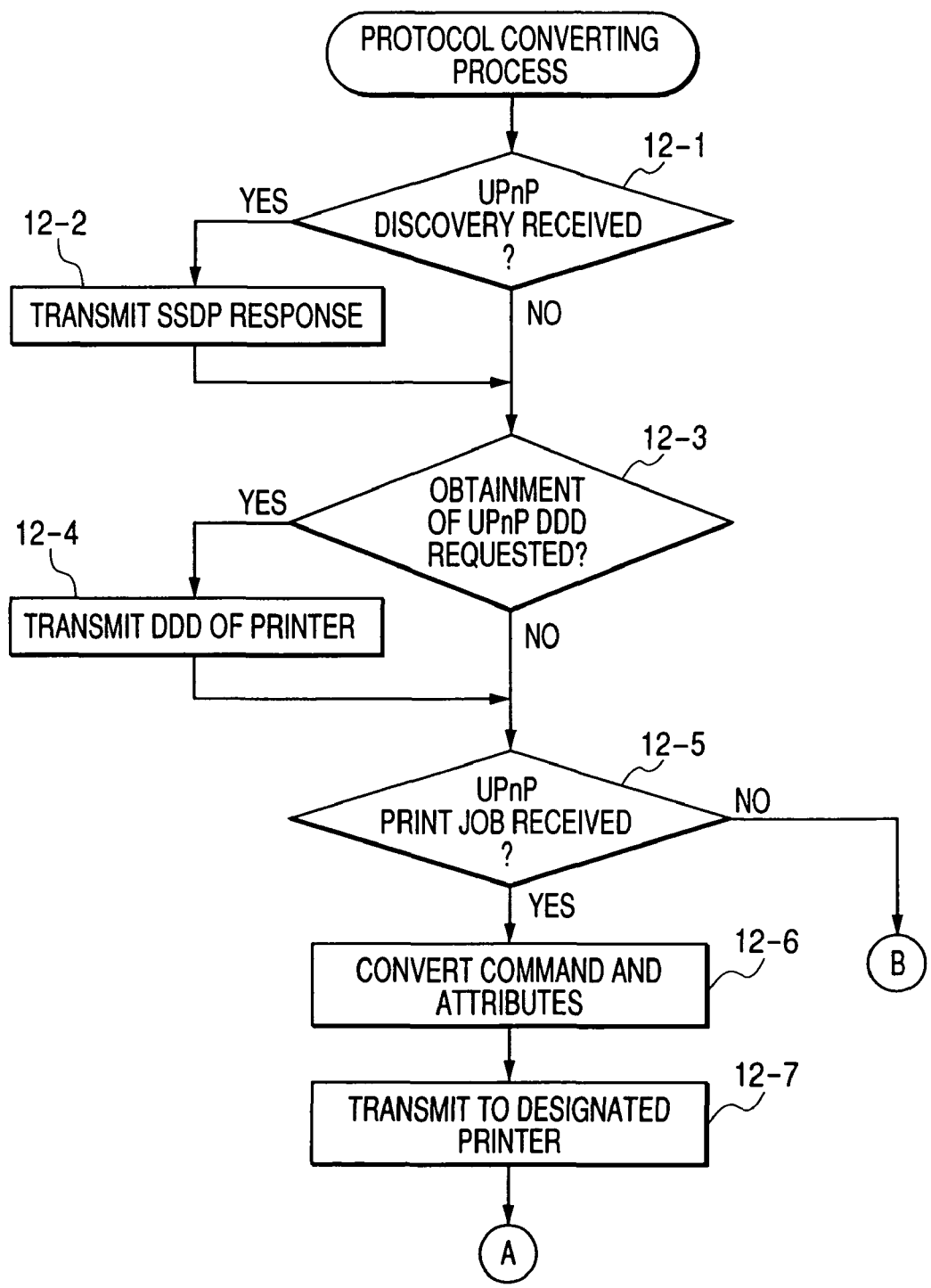
FIG. 12 is composed of FIGS. 12A and 12B showing flowcharts of the protocol converting process in the protocol conversion processing method of the protocol conversion system in the invention.
Figure 12B:
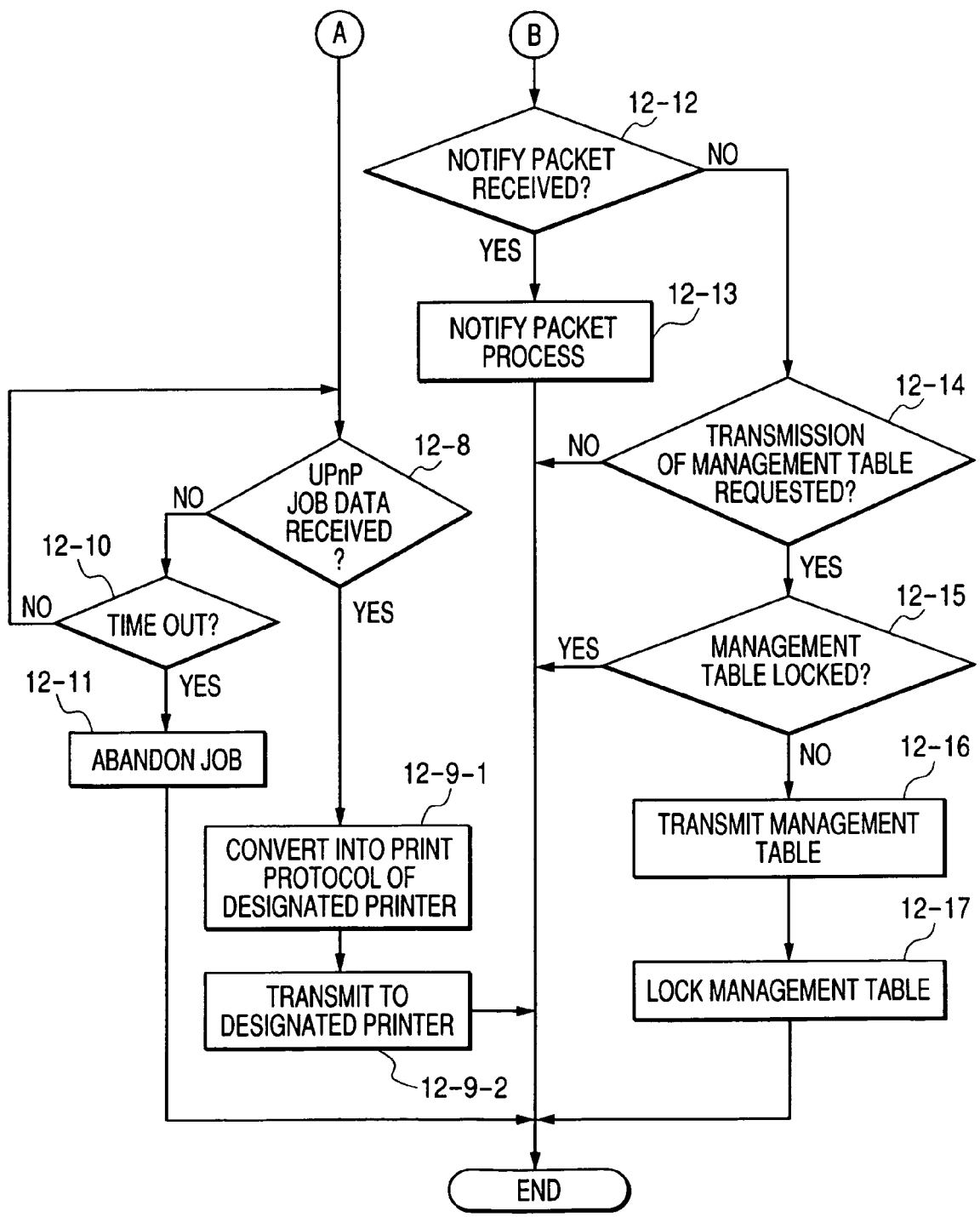

That is, when a management table transmitting request is received from the proxy server switched to the WakeUP status in step 12-14 in the flowcharts of FIGS. 12A and 12B, the protocol conversion processing unit 9016 in the proxy server 9300 discriminates whether the table has been locked or not. If it is not locked, the management table is transmitted in response to the management table transmitting request (step 12-16) and, after that, the management table is locked (step 12-17).

As mentioned above, a control is made so that the number of unlocked proxy servers which can actively distribute the table is limited to only one per device.

Referring again to FIGS. 10A and 10B, if the management table cannot be obtained (step 10-10), the protocol conversion processing unit 9016 in the proxy server 9300 is switched to the sleep mode (step 10-5), continues the sleep mode until the Notify message is received from another proxy, and does not execute the protocol converting process (step 10-6).

If the obtainment of the management table is permitted and the obtainment is completed in step 10-10, the protocol conversion processing unit 9016 in the proxy server 9300 starts to obtain the printer information in step 10-12.

If there is no response within the predetermined time, for example, in the embodiment, within 30 seconds in step 10-3, the protocol conversion processing unit 9016 in the proxy server 9300 advances to step 10-9.

Figure 11B:
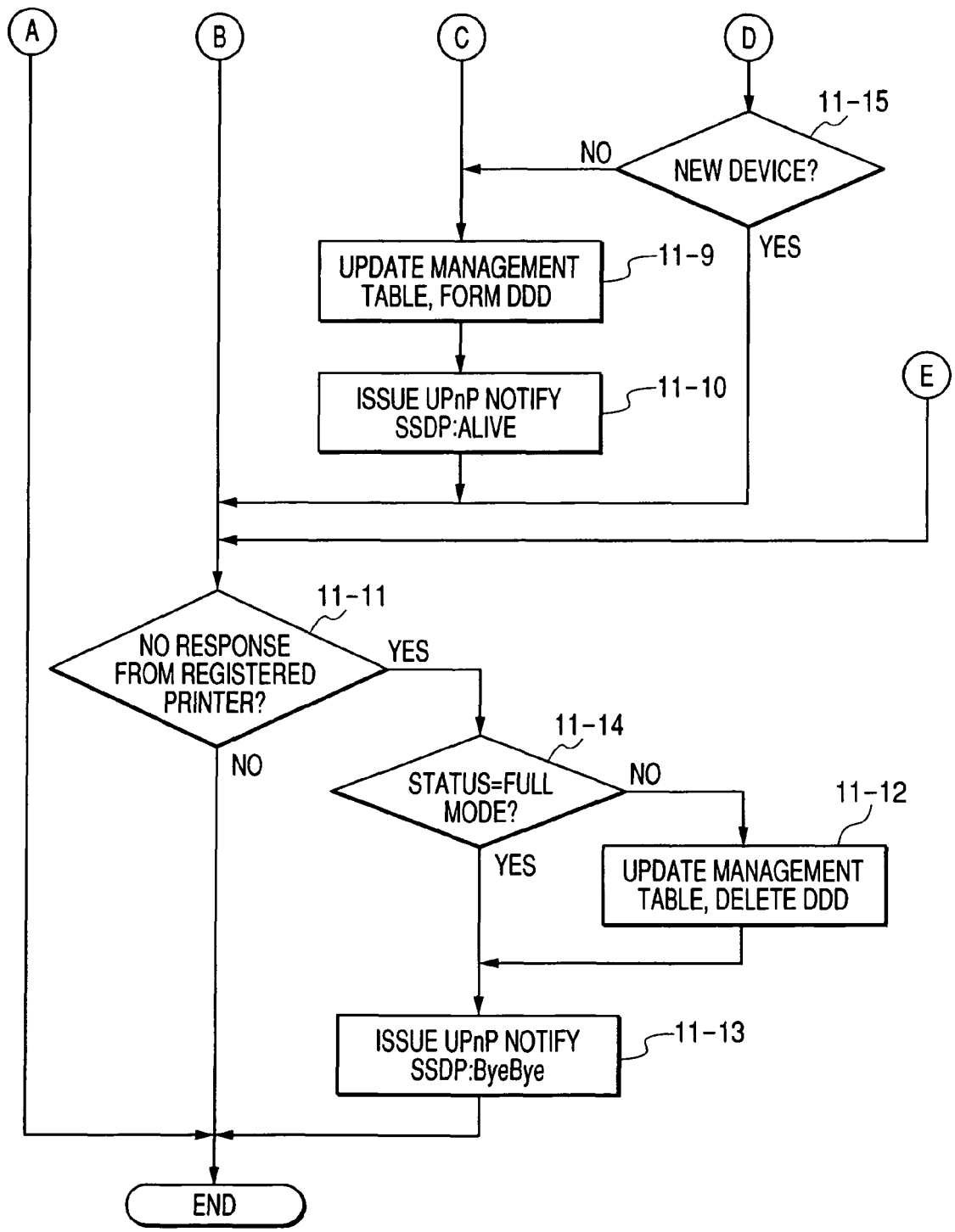
FIG. 11 is composed of FIGS. 11A and 11B showing flowcharts of the printer information obtaining process in the protocol conversion processing method of the protocol conversion system in the invention.

FIGS. 11A and 11B show flows for the control for obtaining the printer information in the proxy server 9300. The protocol conversion processing unit 9016 in the proxy server 9300 broadcasts the SNMP Get request in the packet format to the following MIB object from the SNMP processing unit 9011 in order to obtain the printer information of the printers existing on the network (step 11-1).

PrinterMakerAndModel: Printer vender/model name
PrinterName: Printer name
PrinterLocation: Printer setting location
IPAddress: Printer IP address
MACAddress: Printer MAC address
SupportedPDL: Page description language which is supported
SupportedPrintProtocol: Print protocol which is supported The network supported printer 9200 which received the SNMP Get request forms information corresponding to each object in the SNMP processing unit 9011 and, thereafter, transmits a response as an SNMP response to the proxy server 9300 in a unicast manner.

When the response is received from each network corresponding printer in step 11-2, the protocol conversion processing unit 9016 in the proxy server 9300 compares the contents of each response with the contents of the management table which has already been registered in the recording apparatus (step 11-3). If no response is received in step 11-2, the processing routine is finished.

It should be noted that when the management table becomes full, there are two kinds of statuses. First, there is the status where when a response is newly made by the device, the management table becomes full for the first time while including such a device at this point of time. Second, there is the status where the management table has already been full and the response from further another device has been recognized. In the embodiment, the second FULL status of the proxy server is distinguished as being "status=FULL mode status".

The presence or absence of the printer which has already executed the protocol conversion is discriminated by comparing the management table obtained from the proxy in the "status=FULL mode" in step 10-9 mentioned above in FIGS. 10A and 10B with all management tables which have been already obtained (step 11-4).

If it is determined that the network printers which do not execute the protocol converting process exist, the printers which do not execute the protocol converting process are detected and step 11-8 follows.

If it is determined in step 11-8 that the management table which is managed by the proxy server 9300 is full, that is, if the number of printers which are executing the protocol converting process is equal to or has already reached the number of printer devices which can execute the protocol converting process in the protocol conversion processing unit 9016 in the proxy server 9300, step 11-7 follows.

Subsequently, whether the status of the device detected in step 11-4 mentioned above has been set to FULL mode or not is discriminated (step 11-7). If it is determined in step 11-7 that the status of the detected device is not the FULL mode, the protocol conversion processing unit 9016 in the proxy server 9300 switchs the status to the FULL mode (step 11-5). After that, an HTTPNotify request in a format shown in FIG. 24 is issued to the multicast address 239.255.255.250 and the port number 1900 (step 11-6). At this time, the information shown in FIG. 7 mentioned above is notified as an entity body of the HTTP request. By the Notify packet, the proxy servers other than the proxy server 9300 existing on the network are notified that the proxy server 9300 has been switched to the FULL status. That is, the Notify packet is issued only when the management table becomes full for the first time since the protocol conversion processing unit 9016 has started to operate.

In step 11-8, the protocol conversion processing unit 9016 in the proxy server 9300 discriminates whether or not the number of printers which are executing the protocol converting process at present is less than the number of printer devices which can execute the protocol converting process, that is, whether or not the newly detected printers can execute the protocol converting process.

If it is determined in step 11-8 that the printers can execute the protocol converting process, step 11-7 follows and whether the status is already the FULL mode or not is discriminated. If it is the FULL mode, whether or not the detected printers are the new devices which have never been handled by the proxy server is discriminated (step 11-15).

If it is determined that they are the new devices, step 11-11 follows. If it is determined that they are not the new devices, it means that the devices which have been handled by the proxy server in the past were returned from the standby mode, deep sleep mode, sleep mode, off-line, stop mode, or the like and the protocol converting process becomes necessary again. Therefore, step 11-9 follows. In step 11-9, the protocol conversion processing unit 9016 in the proxy server 9300 records the updated management table into the recording apparatus through the recording apparatus control unit 9015, thereafter, forms a "Device Description Document" specified in "Universal Plug and Play Device Architecture v1.0" on the basis of the obtained information with respect the printers newly registered in the management table, and records it into the recording apparatus through the recording apparatus control unit 9015 (step 11-9). Subsequently, in step 11-10, the Notify packet regarding all of the printers recorded in the management table is issued by the UPnP processing unit 9014 on the basis of the notification means specified in "Universal Plug and Play Device Architecture v1.0", thereby notifying that those printers are executing the services on the network.

When the network printers which have stopped the protocol conversion are detected in step 11-15, the processing routine advances to step 11-9. A "Device Description Document" specified in "Universal Plug and Play Device Architecture v1.0" is formed and recorded into the recording apparatus through the recording apparatus control unit 9015. Subsequently, in step 11-10, the Notify packet regarding all of the printers recorded in the management table is issued by the UPnP processing unit 9014 on the basis of the notification means specified in "Universal Plug and Play Device Architecture v1.0", thereby notifying that those printers are executing the services on the network.

Subsequent to each of the above processes, in step 11-11, whether or not the response can be obtained from the printer in spite of the printer which has already been recorded in its management table in the case where no response is obtained in response to the SNMP Get request which is issued by the proxy server 9300, is discriminated. If no response is obtained in 11-11, whether the status is the FULL mode or not is discriminated (step 11-14). If it is determined in step 11-14 that the status is not the FULL mode, the protocol conversion processing unit 9016 in the proxy server 9300 deletes the printer information and the "Device Description Document" from the management table (step 11-12) and advances to step 11-13.

In step 11-13, after the protocol conversion processing unit 9016 in the proxy server 9300 recorded the updated management table into the recording apparatus through the recording apparatus control unit 9015, the protocol conversion processing unit issues the Notify packet regarding all of the printers deleted from the management table by the UPnP processing unit 9014 on the basis of the notification means specified in "Universal Plug and Play Device Architecture v1.0", thereby notifying that those printers-stopped the services on the network.

If the protocol conversion processing unit 9016 in the proxy server 9300 determines in step 11-14 that the status has been switched to the FULL mode, the relevant printer information is not deleted from the management table. The protocol conversion processing unit 9016 in the proxy server 9300 issues the Notify packet regarding all of the network printers from which there is no response by the UPnP processing unit 9014 on the basis of the notification means specified in "Universal Plug and Play Device Architecture v1.0", thereby notifying that those printers stopped the services on the network (step 11-13). The processing routine is finished.

In the invention, the management table is managed in the format of the text file in which the contents of the SNMP object obtained and described before have been described in XML as shown in FIG. 25. A table of the printers is defined in FIG. 25. Each printer is defined in a portion sandwiched between printer tags <Printer> and </Printer>. In the diagram, as described between the tags, a printer name, a setting location, an IP address, an MAC address, a corresponding language, a print protocol which is supported, and the like are defined. When information is obtained from a plurality of printers, similarly, the information of a plurality of printers is written in portions shown by *** marks and can be managed.

When the printer information obtaining process is completed, the protocol conversion processing unit 9016 in the proxy server 9300 starts the protocol converting process of step 10-13.

Flowcharts of FIGS. 12A and 12B show flows for the protocol converting process.

When the protocol conversion processing unit 9016 in the proxy server 9300 receives a reception notification of a device searching protocol "Simple Service Discovery Protocol (SSDP)" packet which is issued from the client and specified in "Universal Plug and Play Device Architecture v1.0" from the UPnP protocol processing unit 9014 (step 12-1), the management table managed by the protocol conversion processing unit 9016 in the proxy server 9300 is searched through the recording apparatus control unit 9015 and the URL in which the "Device Description Document" of the printer corresponding to the searching conditions of the SSDP packet is returned as an SSDP response through the UPnP protocol processing unit 9014 (step 12-2).

When the obtaining request of the "Device Description Document" is received from the UPnP protocol processing unit 9014 by the HTTPGet request from the client device which obtained such a URL (step 12-3), the management table managed by the protocol conversion processing unit 9016 in the proxy server 9300 is searched through the recording apparatus control unit 9015 and the "Device Description Document" recorded in the designated URL is read out and, thereafter, returned through the UPnP protocol processing unit 9014 (step 12-4).

The print job is issued from the client device which obtained the "Device Description Document" on the basis of the control means specified in "Universal Plug and Play Device Architecture v1.0". Since the job command and the job attributes are described in the format of XML in this case, when the protocol conversion processing unit 9016 in the proxy server 9300 receives the print job through the UPnP protocol processing unit 9014 (step 12-5), the protocol conversion processing unit 9016 analyzes the command and the job attributes in the SOAP processing unit 9013, subsequently, obtains the print protocol which is supported and the IP address in the management table information corresponding to the printer whose output has been designated through the recording apparatus control unit 9015, and converts the received command and attribute information into such a print protocol (step 12-6). After that, the information after the conversion is transmitted to the IP address of the printer whose output has been designated (step 12-7). The client which issued the print job subsequently transmits the job data, in this case, PDL to the proxy server 9300 by using the HTTPPost command on the basis of the control means specified in "Universal Plug and Play Device Architecture v1.0". The protocol conversion processing unit 9016 in the proxy server 9300 which received the job data converts the received job data into the print protocol which is supported by the designated printer (step 12-9-1) and transmits the job data to the IP address of the printer which has been obtained before (step 12-9-2) in a manner similar to that mentioned above.

When the reception of the job data is not started from the client within a predetermined time, for example, in the embodiment, within 30 seconds (step 12-10), the job is abandoned (step 12-11).

The printer which received the job command, job attributes, and job data analyzes the job command and job attributes by the print control unit, thereafter, transmits the print job to the printer controller, and executes printing.

The proxy server 9300 in the invention repetitively executes the above processes to thereby periodically update the operating state of the network printer, and executes the protocol converting process in accordance with the updated information.

When the protocol conversion processing unit 9016 in the proxy server 9300 stops the protocol converting process because of the power-off in step 10-14, the protocol conversion processing unit 9016 reads out all management tables through the recording apparatus control unit 9015 on the basis of the notification means specified in "Universal Plug and Play Device Architecture v1.0", issues the Notify packet regarding all of the printers recorded in the management table through the UPnP protocol processing unit 9014, and notifies that those printers stopped the services on the network (step 10-15). After the execution of the notifying process by the UPnP protocol, the protocol conversion processing unit 9016 issues the HTTPNotify request in the format shown in FIG. 11 to the multicast address 239.255.255.250 and the port number 1900 (step 10-16). At this time, the following information is described in the XML format and notified as an entity body of the HTTP request.

In the diagram,

<status>: Indicates an operation status of the proxy server. In this case, ByeBye, that is, the stop of the protocol converting process is notified.

<protocol>: Indicates a protocol which can be converted by the proxy server. A protocol name such as UPnP, BMLinkS, Rendezvous, or the like is described. In the embodiment, UPnP proposed mainly by Microsoft Corporation is described as an example.

<ProxyURL>: An IP address of the proxy server is described in the URL format.

<ProxyMAC>: A physical address (MAC) of the proxy server is described.

<TableURL>: A storing address in the management table which is managed by the proxy server is described in the URL format.

By executing the above processes, the proxy server 9300 notifies another proxy server which operates on the network that the protocol converting process was stopped.

In step 13-6 in the flowchart of FIG. 13, when the protocol conversion processing unit 9016 in the proxy server 9300 receives the Notify packet indicative of the stop of the protocol converting process from another proxy server which was operating on the network, the entity body of the packet is analyzed in the SOAP processing unit 9013 and whether or not the management table has been obtained from the proxy server which issued the Notify packet is discriminated. When the management table is obtained in step 13-7, this management table is deleted through the recording apparatus control unit 9015 (step 13-8).

That is, the converting process of the printer to which the proxy server that issued ByeBye provided the protocol converting process is taken over by the proxy server 9300 which is at present in the working mode.

The protocol conversion processing unit 9016 in the proxy server 9300 switched to the sleep mode in step 10-5 in the flowcharts of FIGS. 10A and 10B monitors the Notify packet which is issued from another proxy server. If even one packet in which the element of <status> is ByeBye or FULL in the entity body of the Notify packet received through the SOAP processing unit 9013 exists, the protocol conversion processing unit 9016 forms a random number of an integer of 1-30 in accordance with a predetermined algorithm and, subsequently, waits for seconds equivalent to a value of the formed random number. After that, the Notify packet issuing process in steps 10-7 and 10-2 are executed.

As mentioned above, the proxy server 9300 as an example of the control apparatus for executing the protocol converting process in the network system in which a plurality of kinds of protocols exist mixedly comprises: the searching means (the function which is realized by a method whereby the CPU in the proxy server 9300 executes the control program stored in the memory as shown in steps 10-3 and 10-4 in FIGS. 10A and 10B) for multicasting the searching request to the network and searching upon activation whether or not another proxy server (not shown) does not exist on the network; the discriminating means (step 10-4) for, when another protocol converting apparatus is searched on the network by the searching means, discriminating whether the searched protocol converting apparatus can execute the protocol converting process or has executed it; and the activating means (for example, the UPnP protocol processing unit 9014 itself in FIG. 9 can activate and execute step 10-13 or the processing step can be also activated from a searching application (not shown) or the OS) for, when it is decided by the discriminating means that the searched protocol converting apparatus cannot execute the protocol converting process or does not execute it, activating step 10-13 as an example of the protocol converting process.

Although the embodiment has been shown on the assumption that the printer is the network device, the network supported device can be realized in any case of the storage device such as a hard disk or the like, the scanner, the copying apparatus, and the device having those hybrid functions which can exchange the attribute information with the proxy server through the communicating function and transmit and receive the job.

The communicating protocol between the proxy server and the network supported device in this case can be also similarly realized by either the standardized or general protocol or the protocol that is unique to the vender.

Although the embodiment has been shown on the assumption that the network supported device is used as an example, the communication between the device and the proxy server can be also realized by communication which is made by the local connection according to USB, IEEE1394, parallel connection, or the like.

Although the proxy server exists on the network in an independent form in the embodiment, such a proxy server function can be also realized in the case where it is physically or logically implemented in the network supported device.

Although the example of "Universal Plug and Play" specified mainly by Microsoft Corporation, SNMP implemented in the network supported printer, and the print protocol has been shown as a combination of the protocol conversion which is provided by the proxy server in the embodiment, the protocol conversion can be also realized in the case of the protocol such as "Rendezvous" proposed by Apple Computer Inc., "BMLinkS" proposed by JBMIA, or the like. The protocol conversion can be also used not only in the case of the protocol in which the search and the control of the devices are integrated but also in the case of the protocol for searching for the services provided by the device such as "Service Location Protocol (SLP)", "Multicast DNS Service Discovery", or the like, and a protocol such as "Web Service" for converting the device control in a "Remote Procedure Call (RPC) format based on XML/SOAP into the conventional control protocol.

In the embodiment, when the Notify packet is issued by HTTP, the additional information is described in the format of XML into the entity of such a packet and the resultant packet is transmitted. However, the description of the entity can be also realized by a description using binary data. It can be also realized by newly defining an HTTP header and using notifying means in a form using such a header.

Although the embodiment has been shown with respect to the example in which the HTTP/TCP/UDP/IP protocol is used as an information notifying protocol between the proxy servers, the invention does not depend on transporting means but can be also realized in the case of using another general protocol or an original protocol so long as it can make the bidirectional communication.

As described above, as one aspect of the embodiment, there are provided the following functions: that is, when the protocol converting apparatuses having the same protocol converting function are in the operative mode on the same communication line, the protocol conversion processing apparatus automatically obtains the statuses of other protocol conversion processing apparatuses and can discriminate the execution or standby of the protocol converting process, and when the protocol converting process is executed, the information of the information processing apparatuses which have executed the protocol conversion is obtained from the protocol conversion processing apparatuses which have already executed the same protocol converting process, and the protocol conversion is not executed to those information processing apparatuses. Therefore, it is possible to avoid such a situation that among the protocol conversion processing apparatuses which provide the same protocol converting process, the protocol converting process is executed in an overlapping manner to the same information processing apparatus.

Further, according to another aspect of the embodiment, the protocol conversion processing apparatus to which the invention is applied automatically executes those processes and the converting ability of the protocol conversion processing apparatus can be maximally used even if the users (including the network administrator) who use the information processing apparatus on the network are not concerned with any special setting, control, or the like.

Third Embodiment

A preferred embodiment of the invention will now be described as examples in detail hereinbelow with reference to the drawings. In a manner similar to that mentioned above, protocols, versions, addresses, numerical values, and the like disclosed in the embodiment do not limit the scope of the invention unless otherwise specified.

Figure 16:
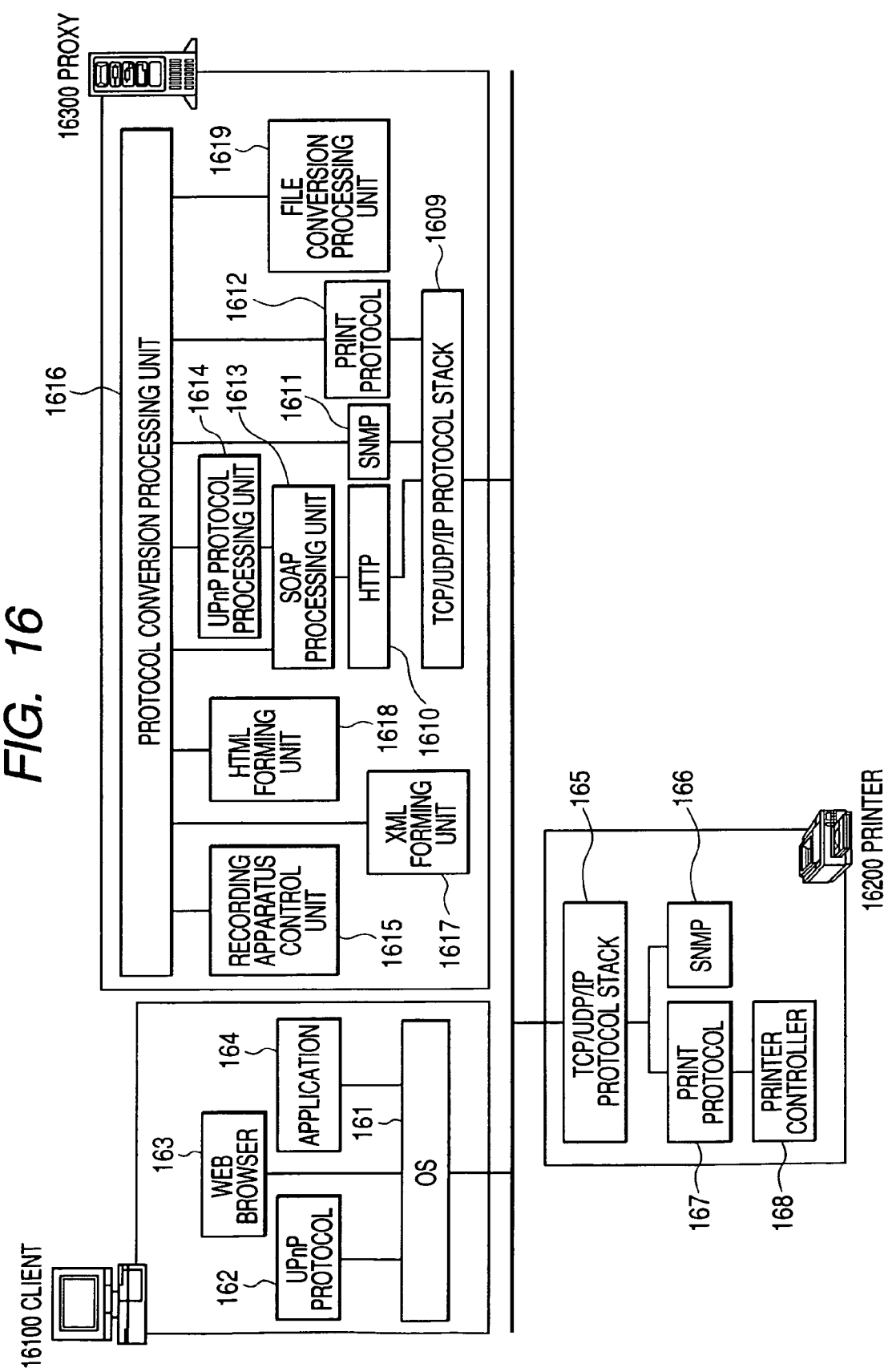
FIG. 16 is a diagram showing each functional construction of the client, proxy server, and network supported printer which construct a protocol conversion system according to an embodiment of the invention.

A protocol conversion system as an embodiment of the service providing system according to the invention will now be described. FIG. 16 is a block diagram showing a construction of a print system according to the embodiment of the invention.

The general operating system such as "Windows (registered trademark)" of Microsoft Corporation, MacOS (registered trademark) of Apple Computer Inc., or the like and general Web browser, application software, and the like which can be executed on the operating system have been installed in a client 16100.

In the case of a "Windows (registered trademark)" OS 161 shown in the embodiment, discovery, control, obtainment of statuses, and the like of the devices on the network are realized by using a "Universal Plug and Play (UPnP)" protocol 162 using "eXtensible Markup Language (XML)"/"Simple Object Access Protocol (SOAP)". A presentation document described in HTML obtained from the UPnP compliant device is displayed by a Web browser 163 and a document formed by, for example, a word processor 164 as application software by using a script or the like installed in the Web browser is transmitted together with print attribute information to a UPnP protocol corresponding printer to which the presentation document has been transmitted.

A network corresponding device, in the embodiment, a network supported printer 16200 has a TCP/UDP/IP protocol stack 165 as a communicating function. A Simple Network Management Protocol (SNMP) processing unit 166 is provided on the protocol stack 165. A print protocol processing unit 167 is mounted on the protocol stack 165 and has functions for analyzing the print request which is issued by the client and sending the print request to a printer controller 168.

The printer does not have the UPnP protocol processing unit and cannot solely respond to a device searching request using the UPnP protocol and a UPnP print job request which are issued by the client 16100.

A proxy server 16300 also similarly has a TCP/UDP/IP protocol stack 1609 as a communicating function. An HTTP 1610 is provided on this protocol stack and an analysis of an HTTP request and a response process are executed.

A Simple Network Management Protocol (SNMP) processing unit 1611 is provided on the protocol stack 1609. The search of the network supported printer 16200 which does not have the UPnP protocol processing unit and obtainment of information are executed by the above protocol.

A print protocol processing unit 1612 is provided on the protocol stack 1609. An issuance of the print job to the network supported printer 16200 which does not have the UPnP protocol processing unit is executed in the print protocol processing unit 1612.

A Simple Object Access Protocol (SOAP) processing unit 1613 is provided for an upper layer of the HTTP 1610. When a UPnP protocol processing unit 1614 and a protocol conversion processing unit 1616 exist on the network, respectively, and when a plurality of clients 16100 and a plurality of proxy servers exist on the network through the SOAP processing unit 1613, respectively, the bidirectional communication of the data described by the "eXtensible Markup Language (XML)" is realized.

The protocol conversion processing unit 1616 is located in an upper layer of the SNMP processing unit 1611, SOAP processing unit 1613, UPnP processing unit 1614, print protocol processing unit 1612, a recording apparatus control unit 1615, an XML forming unit 1617, and an HTML forming unit 1618 and executes the following processes. That is, after various XML documents which are used in the UPnP protocol are formed by the XML forming unit 1617 and the presentation document which is used in the UPnP protocol is formed by the HTML forming unit 1618, information of the network supported printer obtained through the SNMP processing unit 1611 is recorded into a recording apparatus which is controlled by the recording apparatus control unit 1615 or, when there is a request from the UPnP protocol, an XML document and the presentation document recorded in the corresponding management table are read out through the recording apparatus control unit 1615 and transmitted to the UPnP protocol processing unit 1614, and the like.

When the request for the print job by the UPnP protocol is received, the protocol conversion processing unit 1616 obtains a job command and job attribute information through the SOAP processing unit 1613, converts their contents into a print protocol supported by the printer whose output has been designated, and thereafter, transmits the job to the designated printer through the print protocol processing unit 1612. At this time, the job attributes are analyzed and when the type of the received job data is the data type which is not supported by the designated printer, the file conversion processing unit 1619 converts the data into printable data supported by the designated printer and, thereafter, transmits the job to the designated printer through the print protocol processing unit 1612.

The protocol conversion processing unit 1616 executes processes for writing and reading out the management table which is managed by the proxy server 16300 into/from the recording apparatus which is controlled by the recording apparatus control unit 1615 through the control unit 1615.

Similarly, when the protocol conversion processing unit 1616 obtains a management table which is managed by another proxy server existing on the network, it executes processes for writing and reading out it into/from the recording apparatus which is controlled by the recording apparatus control unit 1615 through the control unit 1615.

A flow of the control of the present system will now be described hereinbelow in accordance with a flowchart of FIG. 17.

After the protocol conversion processing unit 1616 in the proxy server 16300 is activated, it clears through the recording apparatus control unit 1615 the contents in the management table in which the information of the network device which has executed the protocol converting process is recorded (step 17-1). Details of the management table will be explained in the following processes.

Subsequently, when the client participates in the network and starts services, the processing routine advances to step 17-2 in order to search for the network corresponding printer existing on this network and the obtainment of the printer information is started.

Figure 18:
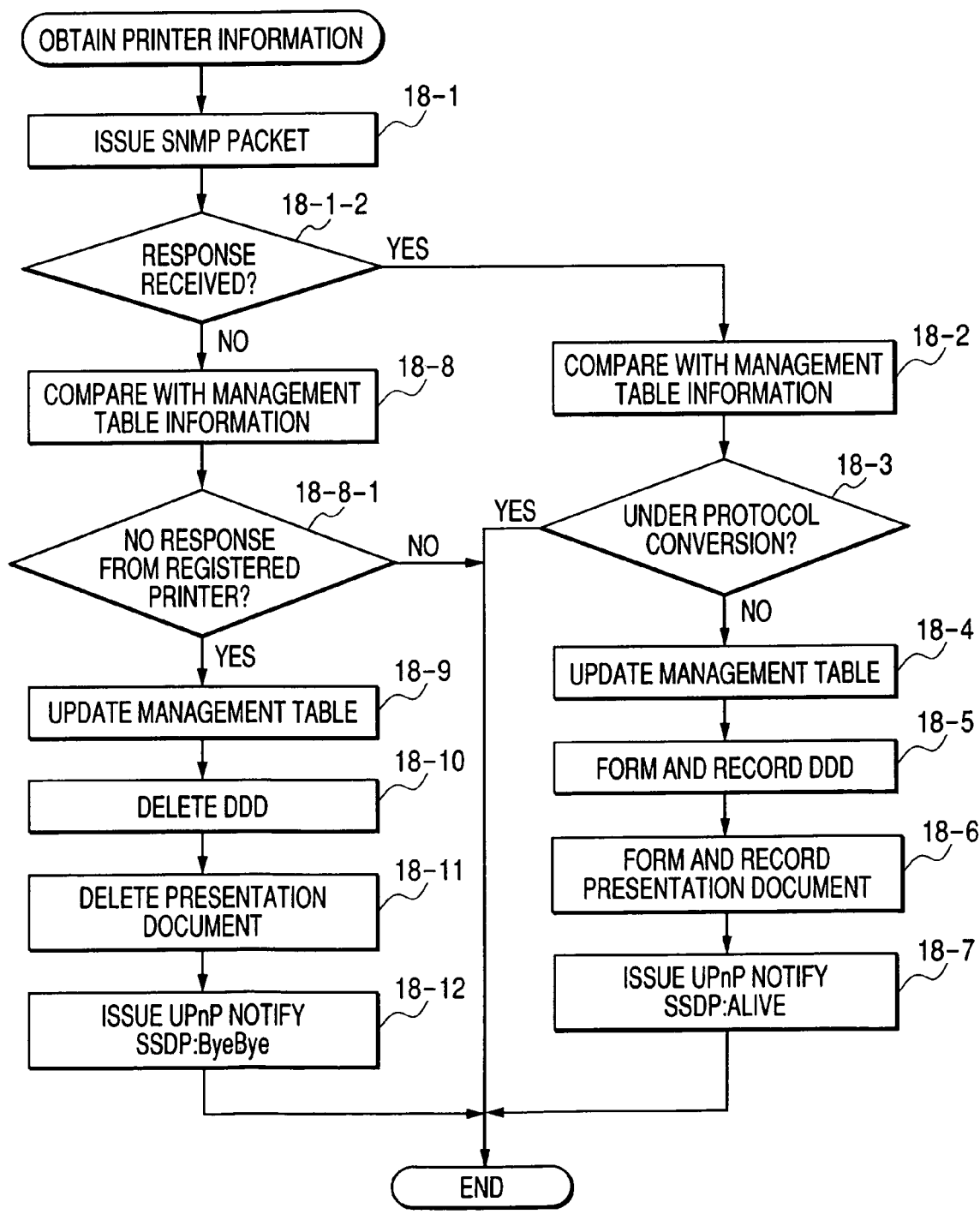
FIG. 18 is a flowchart showing a process for obtaining a UPnP compliant printer information in the protocol conversion processing method of the protocol conversion system in the invention.

A flowchart of FIG. 18 shows a flow for the control for obtaining the printer information.

The protocol conversion processing unit 1616 in the proxy server 16300 broadcasts an SNMP Get request to the following MIB object from the SNMP processing unit 1611 in order to obtain the printer information of the printers existing on the network (step 18-1). In step 18-1-2, whether the response has been received or not is discriminated. If the response has been received in step 18-1-2, step 18-2 follows. If no response is received in step 18-1-2, step 18-8 follows.

PrinterMakerAndModel: Printer vender/model name

PrinterName: Printer name

PrinterLocation: Printer setting location

IPAddress: Printer IP address

MACAddress: Printer MAC address

SupportedPDL: Page description language which is supported

SupportedPrintProtocol: Print protocol which is supported

The network supported printer 16200 which received the SNMP Get request which is issued by the proxy server in step 18-1 form information corresponding to each object in the SNMP processing unit 1611 and, thereafter, transmit a response as an SNMP response to the proxy server 16300 in a unicast manner.

The protocol conversion processing unit 1616 in the proxy server 16300 which received the response from each network supported printer in S18-1-2 compares contents of each response with contents in the management table which has already been registered in the recording apparatus (step 18-2). Subsequently, the protocol conversion processing unit 1616 discriminates whether or not the printer is a printer which has already executed the protocol conversion (step 18-3). If it is determined in S18-3 that the printer is a printer which has executed the protocol converting process, the processing routine is finished.

If it is determined in S18-3 that the printer is a printer which does not execute the protocol conversion, that is, a printer which has newly been found, the protocol conversion processing unit 1616 in the proxy server 16300 adds the information obtained as a response of the SNMP Get request into the management table and updates it and records it into the recording apparatus through the recording apparatus control unit 1615 (step 18-4).

Subsequently, with respect to the printer newly registered in the management table, "Device Description Document" specified in "Universal Plug and Play Device Architecture v1.0" is formed by the XML forming unit 1617 on the basis of the obtained information and the formed document is recorded into the recording apparatus through the recording apparatus control unit 1615 (step 18-5) and the presentation document described in HTML is formed in the HTML forming unit 1618. Icons, image data, and the like which are necessary for forming the presentation document have been recorded in the recording apparatus. The HTML forming unit 1618 obtains the necessary information through the recording apparatus control unit 1615. The presentation document formed by the HTML forming unit 1618 is recorded into the recording apparatus through the recording apparatus control unit 1615 (step 18-6).

In step 18-7, on the basis of notification means specified in "Universal Plug and Play Device. Architecture v1.0", a Notify packet regarding all of the printers recorded in the management table is issued by the UPnP protocol processing unit 1614, thereby notifying that those printers are executing the services on the network.

If no response is obtained for the SNMP Get request which is issued by the proxy server 16300, step 18-8 follows. In step 18-8, the presence or absence of the printers which have already been registered in its own management table is discriminated. In step S18-8-1, whether or not the printer is a printer which has already been registered is discriminated. If it is determined in step S18-8-1 that the registered printer exists, the protocol conversion processing unit 1616 in the proxy server 16300 deletes the printer information from the management table and updates it (step 18-9). Subsequently, deletion of the "Device Description Document" (step 18-10) and deletion of the presentation document (step 18-11) are executed.

The protocol conversion processing unit 1616 in the proxy server 16300 records the updated management table into the recording apparatus through the recording apparatus control unit 1615. After that, the protocol conversion processing unit issues the Notify packet regarding all of the printers deleted from the management table from the UPnP processing unit 1614 on the basis of the notification means specified in "Universal Plug and Play Device Architecture v1.0" and notifies that those printers have stopped the services on the network (step 18-12).

In the invention, as shown in FIG. 26, the management table is managed in the format of the text file in which the contents of the obtained SNMP object mentioned above have been described in XML.

Figure 17:
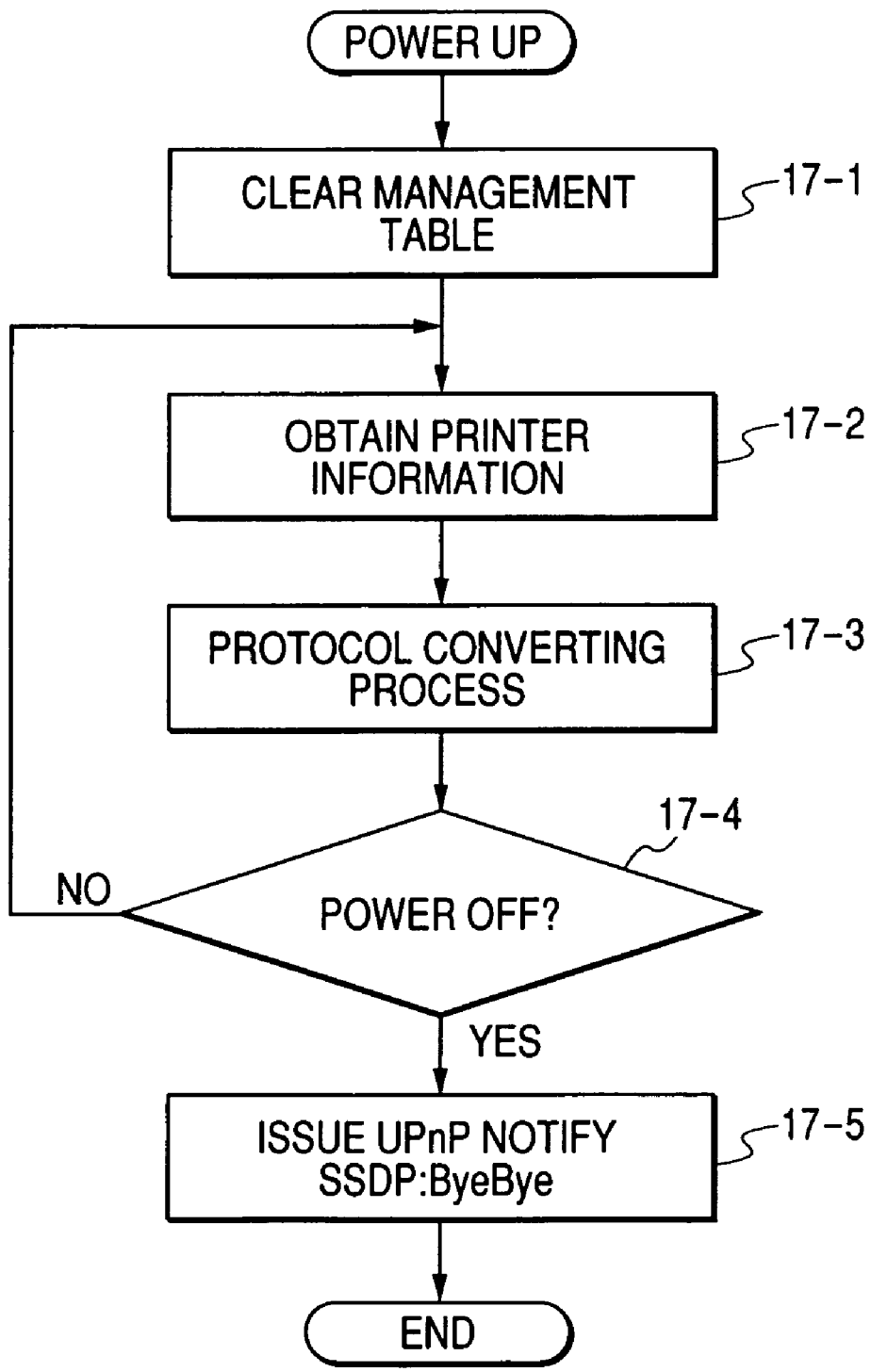
FIG. 17 is a whole flowchart showing the protocol conversion processing method of the protocol conversion system in the invention.

The processes described above in FIG. 18 correspond to the printer information obtaining process in FIG. 17. Returning to FIG. 17, after completion of the printer information obtaining process, the protocol conversion processing unit 1616 in the proxy server 16300 starts the protocol converting process (step 17-3).

Figure 20B:
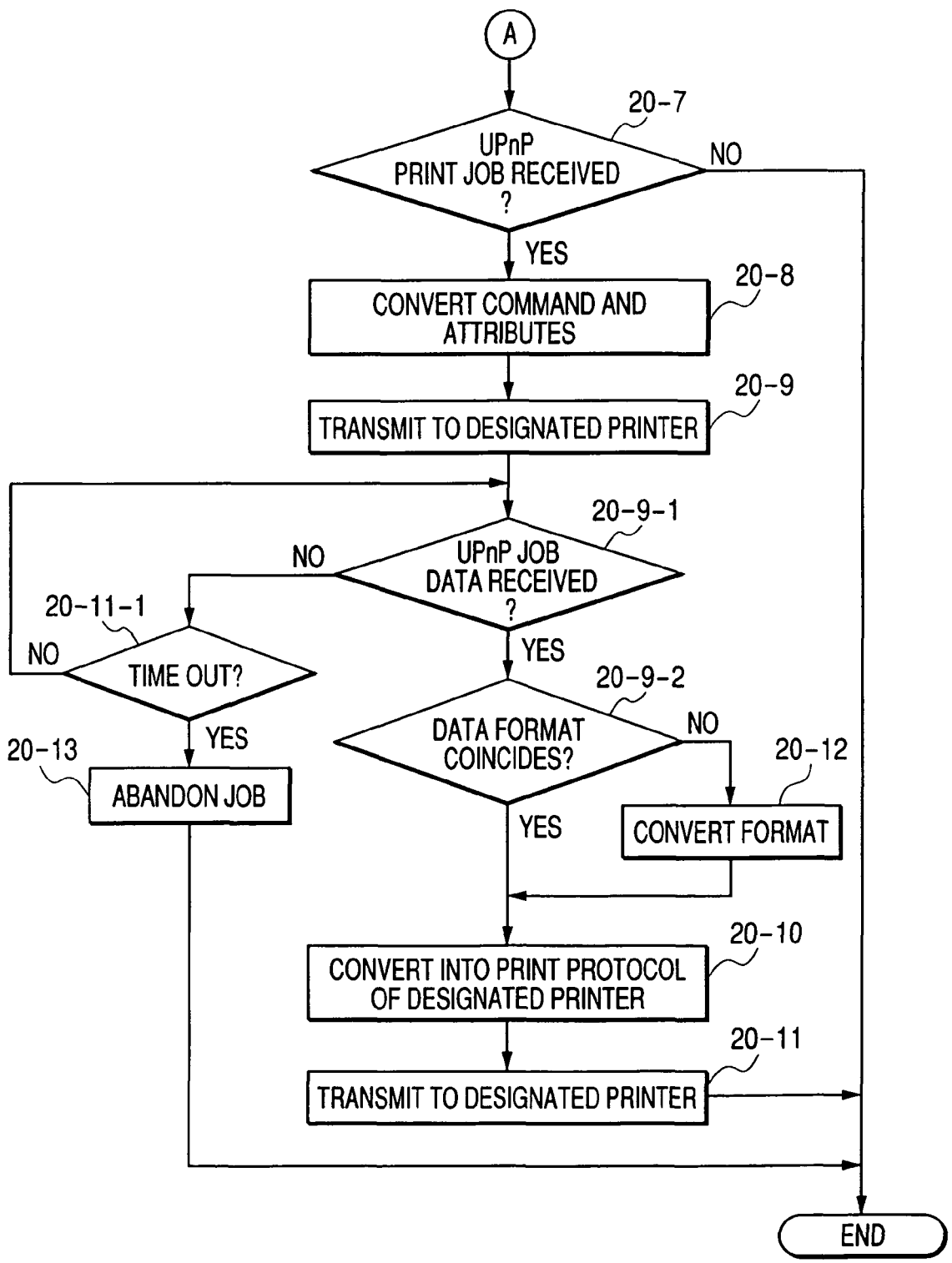
FIG. 20 is composed of FIGS. 20A and 20B showing flowcharts of the process for the protocol converting process in the protocol conversion processing method of the protocol conversion system in the invention.

Detailed processes are shown hereinbelow by using FIGS. 20A and 20B. Flowcharts of FIGS. 20A and 20B show flows for the protocol converting process. The protocol conversion processing unit 1616 in the proxy server 16300 discriminates whether or not the reception notification of a device searching protocol "Simple Service Discovery Protocol" (SSDP) packet which is issued by the client has been received from the UPnP protocol processing unit 1614 and specified in "Universal Plug and Play Device Architecture v1.0" (step 20-1). If it is determined that it has been received in step 20-1, step S20-2 follows. If it is decided that it is not received, step S20-3 follows.

In S20-2, the management table which is managed by the protocol conversion processing unit 1616 in the proxy server 16300 is searched through the recording apparatus control unit 1615. The URL in which "Device Description Document" of the printer corresponding to the searching conditions of the SSDP packet has been recorded is returned as an SSDP response through the UPnP protocol processing unit 1614 (step 20-2), and step 8-3 follows.

Whether or not a request to obtain "Device Description Document" has been received through the UPnP protocol processing unit 1614 by the HTTPGet request from the client device which obtained such a URL is discriminated (step 20-3). If it is determined in step 20-3 that the obtaining request has been received, the management table which is managed by the protocol conversion processing unit 1616 in the proxy server 16300 is searched through the recording apparatus control unit 1615. "Device Description Document" recorded in the designated URL is read out and, thereafter, returned through the UPnP protocol processing unit 1614 (step 20-4) and step 20-5 follows. If it is decided in step 20-3 that the obtaining request is not received, step 20-5 follows.

A storage destination of the presentation document formed in step 18-6 has been recorded by URL in the "Device Description Document". Whether or not the obtaining request of the presentation document has been received from the UPnP protocol processing unit 1614 by the HTTPGet request from the client device is discriminated (step 20-5). If it is determined that the obtaining request of the presentation document has been received, step 20-6 follows. In step 20-6, the management table which is managed by the protocol conversion processing unit 1616 in the proxy server 16300 is searched through the recording apparatus control unit 1615. The presentation document recorded in the designated URL is read out and, thereafter, returned through the UPnP protocol processing unit 1614. If it is decided that the obtaining request of the presentation document is not received, step 20-7 follows.

In the case of the client 16100 shown in the embodiment, the operating system corresponds to the UPnP protocol. After completion of the reception of the presentation document from the proxy server 16300 in step 20-6, the Web browser is automatically activated and the received presentation document is displayed.

Figure 21:
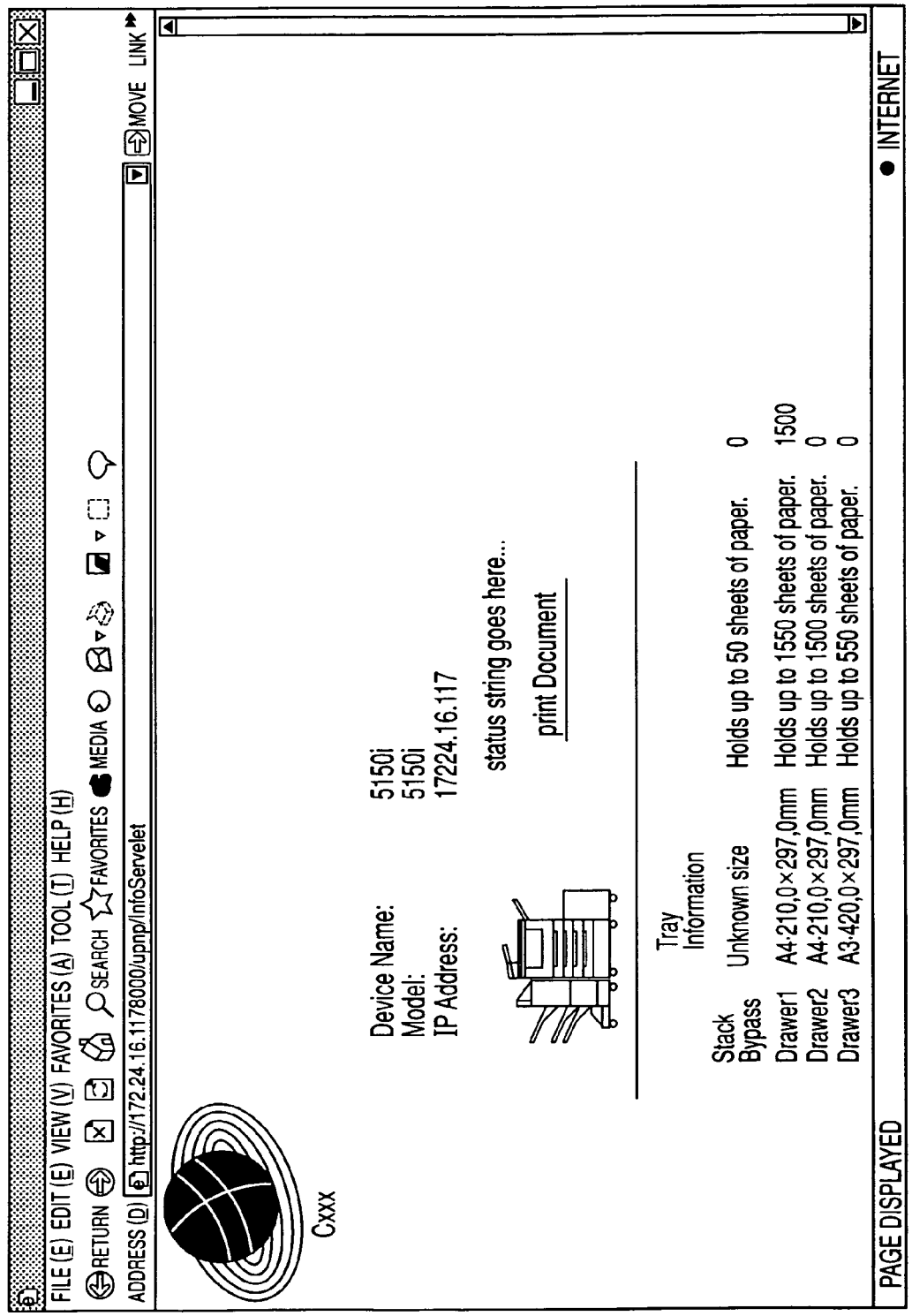
FIG. 21 shows a presentation document which is formed by a protocol converting apparatus in the invention.

FIG. 21 shows contents of the presentation document displayed on the display of the client 16100. By seeing this display, the user who uses the client 16100 can visually confirm information such as device name, model name, IP address, implementing state of an option, and the like regarding the network supported printer 16200 through the display contents.

Figure 22:
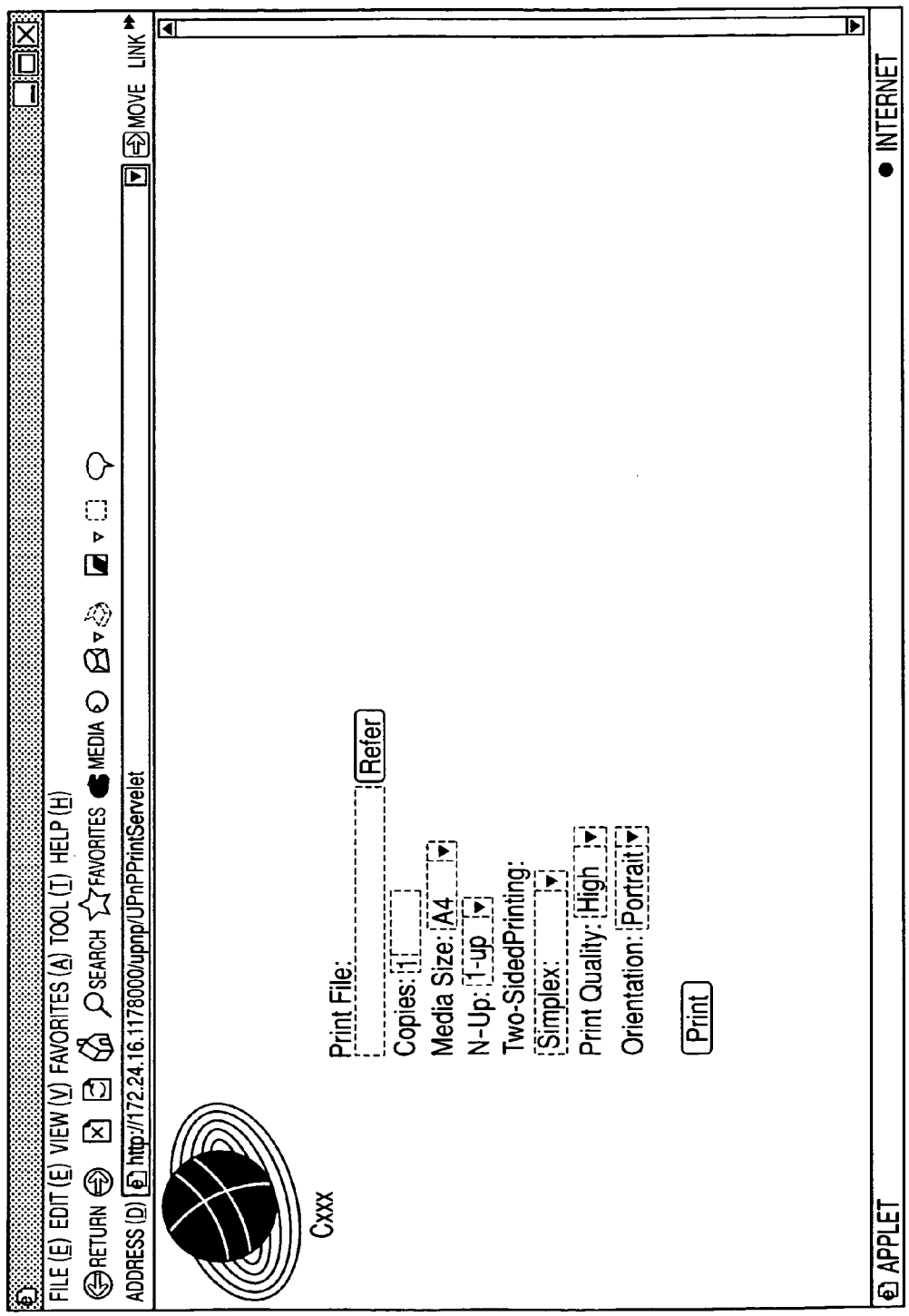
FIG. 22 shows a presentation document which is formed by the protocol converting apparatus in the invention.

When "Print document" in the above display is clicked, the display screen is switched to a page shown in FIG. 22. With respect to the network supported printer 16200, the following job attributes can be designated. The designation of the file to be outputted: Print File, the number of output copies: Copy, a size of output sheet: Media Size, a page layout: N-Up, designation of the two-sided/simplex printing: Two-sided printing, print quality: Print Quality, orientation: Orientation, and the like. After completion of the settings of those attribute information, by clicking a Print button, the script described in the presentation document forms an SOAP envelope in accordance with a schema specified in "Universal Plug and Play Device Architecture v1.0" and, thereafter, the HTTPPost request is issued to the proxy 16300.

When the protocol conversion processing unit 1616 in the proxy server 16300 received the request through the UPnP protocol processing unit 1614 (step 20-7), the protocol conversion processing unit 1616 analyzes the command and the job attributes in the SOAP processing unit, subsequently obtains the print protocol which is supported and the IP address in the information of the management table corresponding to the printer whose output has been designated through the recording apparatus control unit 1615, and converts the received command and the received attribute information into the print protocol (step 20-8). After that, the information after the conversion is transmitted to the IP address of the printer whose output has been designated (step 20-9).

The client which issued the print job subsequently transmits the job data to the proxy server 16300 by using the HTTPPost command on the basis of the control means specified in "Universal Plug and Play Device Architecture v1.0". The protocol conversion processing unit 1616 in the proxy server 16300 which received the job data analyzes a data type of the reception data. When the data type coincides with "SupportedPDL: Page description language which is supported" which is recorded in the management table obtained in step 18-4, in a manner similar to that in the foregoing steps, the received job data is converted into the print protocol which is supported by the designated printer (step 20-10) and the job data is transmitted to the printer IP address which has been obtained before (step 20-11).

Whether the UPnP job data has been received or not is discriminated in step 20-9-1. If it is determined in step 20-9-1 that the UPnP job data has been received, step 20-9-2 follows. In step 20-9-2, as a result of the analysis of the data type of the reception data, if it is determined that it does not coincide with "SupportedPDL: Page description language which is supported" which is recorded in the management information obtained in step 18-4, the protocol conversion processing unit 1616 converts the received data into the obtained printer PDL data in a file conversion processing unit 1619 in step 20-12 and, thereafter, converts it into the print protocol which is supported by the designated printer (step 20-10). Subsequently, the job data after the conversion is transmitted to the printer IP address obtained before (step 20-11) and the processing routine is finished.

As a result of the analysis of the data type of the reception data, if it is determined in step 20-9-2 that it coincides with "SupportedPDL: Page description language which is supported" which is recorded in the management information obtained in step 18-4, the processing routine advances to step 20-10 and similarly advances to a process in step 20-11. The processing routine is finished.

If the job data is not received in step 20-9-1 and if it is determined in step 20-11-1 that a predetermined time has elapsed, when the reception of the job data is not started by the client within 30 seconds in the embodiment, the job is abandoned (step 20-13).

The printer which received the job command, job attributes, and job data analyzes the job command and the job attributes in the print control unit, thereafter, transmits the print job to the printer controller, and executes the printing.

The proxy server 16300 in the invention repetitively executes the processes in steps 17-2 and 17-3 mentioned above to thereby periodically update the operating mode of the network printer, and executes the protocol converting process in accordance with the updated information.

In step 17-4, whether the protocol conversion processing unit 1616 in the proxy server 16300 stops the protocol converting process because of the power-off is discriminated. If it is determined in step 17-4 that it stops the protocol converting process, the protocol conversion processing unit 1616 reads out all of the management tables through the recording apparatus control unit 1615 on the basis of the notification means specified in "Universal Plug and Play Device Architecture v1.0", issues the Notify packet regarding all of the printers recorded in the management table through the UPnP protocol processing unit 1614, and notifies that those printers have stopped the services on the network (step 17-5).

If it is decided in step 17-4 that it does not stop the protocol converting process, the processing routine is returned to the printer information obtaining process (step 17-2).

Although the embodiment has been shown on the assumption that the printer is the network device, the network supported device can be realized in any case of the storage device such as a hard disk or the like, the copying apparatus, and the device having those hybrid functions which can exchange the attribute information with the proxy server through the communicating function and transmit and receive the job.

The communicating protocol between the proxy server and the network supported device in this case can be also similarly realized by either the standardized or general protocol or the protocol that is unique to the vender.

Although the embodiment has been shown on the assumption that the network supported device is used as an example, the communication between the device and the proxy server can be also realized by communication which is made by the local connection according to USB, IEEE1394, parallel connection, or the like.

Although the proxy server exists on the network in an independent form in the embodiment, such a proxy server function can be also realized in the case where it is physically or logically implemented in the network supported device. Similarly, such a proxy server function can be also realized in the case where it is physically or logically implemented in the network client device.

Although the example of "Universal Plug and Play" specified mainly by Microsoft Corporation, SNMP implemented in the network supported printer, and the print protocol has been shown as a combination of the protocol conversion which is provided by the proxy server in the embodiment, the protocol conversion can be also realized in the case of the protocol such as "Rendezvous" proposed by Apple Computer Inc., "BMLinkS" proposed by JBMIA, or the like. The protocol conversion can be also used not only in the case of the protocol in which the search and the control of the devices are integrated but also in the case of the protocol for searching for the services provided by the device such as "Service Location Protocol (SLP)", "Multicast DNS Service Discovery", or the like and a protocol such as "Web Service" for converting the device control in a "Remote Procedure Call (RPC)" format based on XML/SOAP into the conventional control protocol.

Although the embodiment has been shown with respect to the example in which the HTTP/TCP/UDP/IP protocol is used as an information notifying protocol between the proxy servers, the invention does not depend on the transporting means but can be also realized in the case of using another general protocol or a unique protocol so long as it can make the bidirectional communication.

Other Embodiments

The processes shown in the diagrams in the embodiments are executed by the CPUs (central processing units) provided for the client, proxy server, and printer in accordance with programs which are installed from the outside, respectively. In this case, the invention is also applied to the case where an information group including the programs which is supplied from a storing medium such as CD-ROM, flash memory, FD, or the like or from an external storing medium through the network.

Naturally, the objects of the invention are also accomplished by a method whereby the storing medium in which program codes of the software which realizes the functions of the foregoing embodiments have been recorded as mentioned above is supplied to a system or an apparatus or downloaded from an external server (not shown), so that a computer (or a CPU or an MPU) of the system or apparatus reads out and executes the program codes stored in the storing medium.

In this case, the program codes themselves read out from the storing medium realize the novel functions of the invention. The storing medium in which the program codes have been stored constructs the invention. As a storing medium for supplying the program codes, for example, a floppy disk, a hard disk, an optical disk, a magnetooptic disk, a DVD, a CD-ROM, a magnetic tape, a non-volatile memory card, a ROM, an EEPROM, or the like can be used.

Naturally, the invention incorporates not only the case where a computer executes the read-out program codes, so that the functions of the embodiments mentioned above are realized, but also the case where the OS (Operating System) or the like which is operating on the computer executes a part or all of actual processes and the functions of the embodiments mentioned above are realized by those processes on the basis of instructions of the program codes. Further, naturally, the invention also incorporates the case where the program codes read out from the storing medium are written into a memory provided for a function expanding board inserted into the computer or a function expanding unit connected to the computer, after that, a CPU or the like provided for the function expanding board or the function expanding unit executes a part or all of actual processes and the functions of the embodiments mentioned above are realized by those processes on the basis of instructions of the program codes.

As described above, according to the first aspect of the invention, when the protocol converting process is executed, in the case where the device corresponding to a plurality of protocols exists mixedly among other devices, if the device searches the network, the device searched by the protocol A and the device searched by the protocol B can be properly recognized in a well coordinated manner.

According to the second aspect of the invention, even when a plurality of proxy servers are activated, the proxy servers properly arbitrate each other and properly execute the protocol conversion of the devices and the management of the devices can be properly made.

The invention claimed is:

1. A control apparatus for executing a network communication protocol converting process for a predetermined network communication protocol in a network system in which a plurality of kinds of network communication protocols exist, the apparatus comprising:

searching means for searching for one or more network communication protocol converting apparatuses on a network that can execute the network communication protocol converting process, based on a response to a message notified via the network, the message including a status indicating that the control apparatus is activated and information regarding a network communication protocol that the control apparatus can convert;

recognizing means for, if a network communication protocol converting apparatus is found by the searching means, recognizing whether a number of network communication protocol converting processes currently being executed by the network communication protocol converting apparatus found by the search means has reached a maximum number of network communication protocol converting processes that can be executed by the network communication protocol converting apparatus, wherein the maximum number is two or more; and activating means for activating the network communication protocol converting process in the control apparatus, if the recognizing means recognizes that the number of network communication converting processes currently being executed by the network communication protocol converting apparatus found by the search means has reached the maximum number wherein the activating means does not activate the network communication protocol converting process in the control apparatus and the searching means conducts a search again after a predetermined period of time has elapsed, if the recognizing means does not recognize that the number of network communication converting processes currently being executed by the network communication protocol converting apparatus found by the search means has reached the maximum number; and notifying means for notifying via the network a message including a status indicating that the network communication protocol converting process activated by the activating means is stopped, when the network communication protocol converting process activated by the activating means is stopped, in order to cause a network communication protocol converting apparatus other than the control apparatus to take over the network communication protocol converting process.

2. The apparatus according to claim 1, wherein, if the recognizing means does not recognize that the number of network communication converting processes currently being executed by the network communication protocol converting apparatus found by the search means has reached the maximum number, an operating mode is switched to a sleep mode.

3. A control method performed by a control apparatus for executing a network communication protocol converting process for a predetermined network communication protocol in a network system in which a plurality of kinds of network communication protocols exist, the method comprising:

a searching step of searching for one or more network communication protocol converting apparatuses on a network that can execute the network communication protocol converting process, based on a response to a message notified via the network, the message including a status indicating that the control apparatus is activated and information regarding a network communication protocol that the control apparatus can convert;

a recognizing step of, if a network communication protocol converting apparatus is found in the searching step, recognizing whether a number of network communication protocol converting processes currently being executed by the network communication protocol converting apparatus found in the search step has reached a maximum number of network communication protocol converting processes that can be executed by the network communication protocol converting apparatus, wherein the maximum number is two or more; and an activating step of activating the network communication protocol converting process in the control apparatus, if the number of network communication converting processes currently being executed by the network communication protocol converting apparatus found in the search step is recognized in the recognizing step as having reached the maximum number, wherein the activating step is not performed to activate the network communication protocol converting process in the control apparatus and the searching, in the searching step, is conducted again after a predetermined period of time has elapsed, if the number of network communication converting processes currently being executed by the network communication protocol converting apparatus found in the search step is not recognized in the recognizing step as having reached the maximum number; and a notifying step of notifying via the network a message including a status indicating that the network communication protocol converting process activated in the activating step is stopped, when the network communication protocol converting process activated in the activating step is stopped, in order to cause a network communication protocol converting apparatus other than the control apparatus to take over the network communication protocol converting process.

4. The method according to claim 3, wherein, if the number of network communication converting processes currently being executed by the network communication protocol converting apparatus found in the search step is not recognized in the recognizing step as having reached the maximum number, an operating mode is switched to a sleep mode.

5. A computer-recordable storage medium that stores a control program that performs a control method for a network communication protocol converting process for a predetermined network communication protocol in a network system in which a plurality of kinds of network communication protocols exist, wherein the control program causes a computer to execute:

a searching step of searching for one or more network communication protocol converting apparatuses on a network that can execute the network communication protocol converting process, based on a response to a message notified via the network, the message including a status indicating that the control apparatus is activated and information regarding a network communication protocol that the control apparatus can convert;

a recognizing step of, if a network communication protocol converting apparatus is found in the searching step, recognizing whether a number of network communication protocol converting processes currently being executed by the network communication protocol converting apparatus found in the search step has reached a maximum number of network communication protocol converting processes that can be executed by the network communication protocol converting apparatus, wherein the maximum number is two or more; and an activating step of activating the network communication protocol converting process in the control apparatus, if the number of network communication converting processes currently being executed by the network communication protocol converting apparatus found in the search step is recognized in the recognizing step as having reached the maximum number, wherein the activating step is not performed to activate the network communication protocol converting process in the control apparatus and the searching, in the searching step, is conducted again after a predetermined period of time has elapsed, if the number of network communication converting processes currently being executed by the network communication protocol converting apparatus found in the search step is not recognized in the recognizing step as having reached the maximum number; and a notifying step of notifying via the network a message including a status indicating that the network communication protocol converting process activated in the activating step is stopped, when the network communication protocol converting process activated in the activating step is stopped, in order to cause a network communication protocol converting apparatus other than the control apparatus to take over the network communication protocol converting process.

* * * * *